(12) United States Patent
Venton-Walters

(10) Patent No.: US 10,125,839 B2
(45) Date of Patent: Nov. 13, 2018

(54) PLANAR LINKAGE, METHODS OF DECOUPLING, MITIGATING SHOCK AND RESONANCE, AND CONTROLLING AGRICULTURAL SPRAY BOOMS MOUNTED ON GROUND VEHICLES

(71) Applicant: Specialty Enterprises, LLC, Wautoma, WI (US)

(72) Inventor: Roy Venton-Walters, Neshkoro, WI (US)

(73) Assignee: Specialty Enterprises, LLC, Wautoma, WI (US)

( * ) Notice: Subject to any disclaimer, the term of this patent is extended or adjusted under 35 U.S.C. 154(b) by 14 days.

(21) Appl. No.: 15/299,383

(22) Filed: Oct. 20, 2016

(65) Prior Publication Data

US 2017/0067526 A1 Mar. 9, 2017

Related U.S. Application Data

(62) Division of application No. 14/213,145, filed on Mar. 14, 2014, now Pat. No. 9,504,211.

(Continued)

(51) Int. Cl.
*F16F 9/02* (2006.01)
*A01M 7/00* (2006.01)
(Continued)

(52) U.S. Cl.
CPC ............. *F16F 9/02* (2013.01); *A01G 25/09* (2013.01); *A01M 7/0053* (2013.01); *F16F 9/38* (2013.01); *Y10T 403/32008* (2015.01)

(58) Field of Classification Search
CPC .......... F16F 9/02; F16F 9/0209; F16F 9/0218; F16F 9/0227; F16F 9/0236; F16F 9/0245; F16F 9/54; Y10T 403/32; Y10T 403/32008; Y10T 74/11; A47C 27/081; A47C 27/087; A01K 27/005; A01M 7/005;
(Continued)

(56) References Cited

U.S. PATENT DOCUMENTS

| | | | | |
|---|---|---|---|---|
| 1,436,079 A | * | 11/1922 | Black | F16F 13/00 |
| | | | | 267/168 |
| 1,454,394 A | * | 5/1923 | Loyd | B60G 15/06 |
| | | | | 267/64.11 |

(Continued)

*Primary Examiner* — Robert A. Siconolfi
*Assistant Examiner* — San M Aung
(74) *Attorney, Agent, or Firm* — Brannen Law Office, LLC

(57) ABSTRACT

The current invention discloses several methodologies that mitigate shock loading and propensity to resonance in agricultural spray boom structures. These include a near planar linkage for decoupling the boom assembly from the vehicle. This serves to permit further aspects of the invention to: Use the combined mass of the booms and center section as the tuned mass of a tuned mass damper: Act as an enabling part of a boom compliant suspension system to mitigate shock loadings otherwise imposed on the boom system, and: Act as an enabling part of an active boom height and roll control systems to permit the accurate navigation of the boom over undulating terrain. Further aspects include the incorporation of tuned mass dampers in the boom structure and components; and the use of the mass and operation of the boom outboard "breakaway" sections as tuned mass dampers.

4 Claims, 18 Drawing Sheets

Related U.S. Application Data

(60) Provisional application No. 61/794,655, filed on Mar. 15, 2013.

(51) Int. Cl.
*F16F 9/38* (2006.01)
*A01G 25/09* (2006.01)

(58) Field of Classification Search
CPC .............. A01M 7/0053; A01M 7/0057; A01M 7/0071; A01M 7/0075; A01M 7/0078; Y10S 280/10; B63B 27/30; B63B 27/14; B63B 2017/0072
USPC .................. 267/113, 64.11; 188/320, 322.22
See application file for complete search history.

(56) References Cited

U.S. PATENT DOCUMENTS

| | | | | |
|---|---|---|---|---|
| 1,606,467 A | * | 11/1926 | Davis .................... | F16F 9/0236 188/320 |
| 2004/0150143 A1 | * | 8/2004 | Zimmer .................... | E05F 5/02 267/64.11 |
| 2011/0253443 A1 | * | 10/2011 | Sasa ........................ | B60M 1/26 174/40 TD |

* cited by examiner

PLANAR LINKAGE, METHODS OF DECOUPLING, MITIGATING SHOCK AND RESONANCE, AND CONTROLLING AGRICULTURAL SPRAY BOOMS MOUNTED ON GROUND VEHICLES

This United States utility patent application is a divisional application of pending application Ser. No. 14/213,145 filed Mar. 14, 2014, which itself claims priority on and the benefit of provisional application 61/794,655 filed Mar. 15, 2013, the entire contents of both are hereby incorporated herein by reference.

FIELD OF THE INVENTION

The present invention relates to a planar linkage, to the support, isolation and dynamic control of spray booms connected to a tractor, trailer or other vehicle for the purpose of agricultural spraying and to a gas tension spring.

BACKGROUND OF THE INVENTION

Agricultural fields are often sprayed with various spraying solutions, such as herbicides, insecticides, fertilizers, etc. Sprayers for this purpose are required to have a wide span booms furnished with plumbing and multiple spray nozzles, for the liquids being sprayed, at defined intervals across the boom's span: While contemporary span widths may extend as wide as 120 through to 162 feet, with even wider spans predicted in the future. However, when not being used for spraying, these wide-span booms are required to fold away to a stowed position, typically along either side of the vehicle, to permit the vehicle to navigate field entrance gates and traverse tracks, roads or highways, without exceeding either practical or legal width limits.

The vehicles which employ these foldable wide span booms may take the form of farm tractors, trailers or specialist vehicles fitted with chemical tanks or reservoirs to carry the liquids being sprayed, and the spray booms themselves may be fitted typically at either the front or rear of such vehicles on each side of the vehicle on a "center-rack" which also supports plumbing and spray nozzles across the short distance that spans the width of the vehicle itself. Typically, but not universally, this center-rack, along with the booms attached to it, can be elevated or lowered on a four-bar linkage and actuator(s) or other suitable means, to adjust and set the boom/nozzles spray height to achieve to most effective crop spray coverage. Typically, at their attachment to the outer edges of the center-rack, the booms are arranged to pivot about essentially vertical axes, so that they may be rotated in angular displacement through 90° or so from the spraying position which is normal to the vehicle's longitudinal axis, to the folded, stowed position essentially parallel the vehicle's longitudinal axis when viewed in plan. Because of the great length of the booms, it is customary for the booms to be further folded via hinge points located at around the mid-semi-span of each boom. In some cases, where very high span booms are used, further folding hinge points may be used to shorten the folded boom length. In other cases, the folded boom length may be shortened by having the outer semi span of each boom retract telescopically in to the inner boom semi-span. In yet others, a combination of telescopic and folding boom segments may be employed. In most cases, the folding and unfolding action of the booms is conducted by means of actuators, more commonly, hydraulically operated. Conveniently, when the full span of the booms may not be required (because of width limitations of parts of the field being sprayed, for example) spray booms are commonly designed to be operated in the part-folded position, with the outboard sections folded alongside the inboard sections. Thus a boom system might be referred to as a 132-60, or other similar designation, implying in this case a full span of 132 feet, and a semi-folded span of 60 feet.

The loads imposed on the booms during operation have a significant effect on their structural design. It is the mass of the booms' structure itself along with its supported loads including pipework, plumbing, spray nozzles, valves, filters, hydraulic cylinders and sundry masses such as touch-down wheels that is responsible for generating the greater part of its structural loading.

Since the mass of the boom assemblies, as described above, acted on by gravity and by inertial accelerations in the vertical direction, about the roll axis and by inertial and some gravitational components in the longitudinal direction as well as about the yaw axis; maximizing the specific strength of the booms by minimizing their mass relative to their structural strength is an extremely important, if not critical aspect of high-span spray boom design. It is therefore highly advantageous to design high-span spray booms using high-strength lightweight materials and to incorporate specific design features that simplify and aid manufacture, while keeping costs to a minimum.

Of the destructive loads able to be imposed upon the deployed booms by the movement of the vehicle as it traverses the undulating surface of the farm land being sprayed, the vehicle's movement about the roll and yaw axes are potentially the greatest. This is because the booms effective moment of inertia about these axes can be defined as the sum of an infinite number of discrete mass segments each of whose moment is the product of the segment mass and the square of its distance from the roll axis: Therefore because of the large boom span and the distance-squared function, the polar moment of inertia of the deployed booms is truly massive, notwithstanding that the booms' outboard sections can be comparatively light. Accordingly, if the vehicle moves in angular displacement about its roll axis due to continuously varying relative vertical displacements of the wheels at either wheel track, then enormous potentially destructive forces may be generated at the booms' attachments to the center rack, unless some mitigating design features are incorporated to prevent or reduce such forces.

One way that this is currently done is to arrange to allow angular displacements to readily occur between each inner boom and the center-rack at a lower, acceptable level of force, by having a lower longitudinal pivot between the boom and center-rack. Each boom is then maintained in an essentially horizontal position by a hydraulic cylinder that attaches to an upper inboard boom attachment point at one end and to an upper center rack attachment at the other end. By incorporating relatively small pressurized gas accumulators in the positively pressurized hydraulic supply lines to these cylinders, a level of compliance (springing) in angular roll displacement can be achieved between each of the booms and the center-rack/vehicle. Further, by arranging for a control system to lengthen or shorten the each upper boom attachment cylinder, each boom can be controlled independently in angular displacement about the vehicle's roll axis; and this can be used, in conjunction with ground-height sensors mounted, typically, at intervals across the span of the booms, as part of a system to control and maintain to booms essentially parallel to the ground during operation. It also permits control recognition of sudden vehicular roll movements and allows active correction of the boom position relative to the vehicle's roll position when such spurious movements occur. While this has proven to be effective, at least to some extent, the active control response is often considered to be too slow to be fully effective in mitigating the movements and forces caused by sudden roll excursions of the vehicle. Consequently, over the more undulating surfaces, the vehicle speed may have to be reduced to unacceptably slow levels to allow time for the corrective response to take place, or loss of effective control of the outboard boom section heights may take place, giving rise to unnecessarily high boom forces in roll as well as defective spray application and may even cause the boom tips to impact the ground.

Again, according to contemporary practice, the foregoing active roll correction system is sometimes further improved by linking the hydraulic lines feeding two upper boom hydraulic cylinders on either side of the vehicle together via pressure relief valves: In the event that the roll forces imposed on the cylinders gives rise to a hydraulic pressure differential between the cylinders that exceeds a given pre-set level, the relief valves then open and hydraulic fluid is transferred automatically between the two cylinders, allowing the vehicle to effectively roll relative to the pair of booms en-masse without having to react further forces. This may well be an improvement, but it is not a full solution since typically outer boom height control is still rendered somewhat ineffective in practice.

An alternative way that the potentially destructive loads caused by the vehicle's roll excursions from reacting the polar moment of the booms is currently addressed, is to mount the center-rack, to which the booms are attached, on a longitudinally aligned pivot at the center-rack's primary attachment to the vehicle. A torsionally resilient connection may be used at this point and this may take the form of torsionally acting spring elements or other means to help keep the boom in general horizontal alignment, relative to the vehicle, without the vehicle's short term roll movements significantly deflecting the booms in roll, or generating excessively high reaction forces in the booms at their attachment to the center-rack. A further variation on this theme is for the center-rack to be supported by a linkage that results in an effective virtual longitudinal pivot point whose virtual pivotal axis is above the center of gravity of the combined booms and center rack, such that the booms benefit by the pendular stability so generated, at least when travelling on fairly level terrain. The upper boom attachment hydraulic cylinders, or a single hydraulic cylinder and linkage serving to replace them, then acts to change the angular displacement of the pair of booms in roll relative to each other, rather than relative to the vehicle.

A second, independent, control action may then be employed to control the overall position of the linked pair of booms in roll, relative to the ground reference, given by the previously mentioned boom height sensors. Thus, by controlling these two sets of boom roll position criteria, the booms may not only have the roll forces, otherwise imposed on them by the vehicle movement over undulating or rough ground surfaces, reduced or effectively eliminated, but a comprehensive boom height control system can effectively permit the booms to be maintained at an essentially fixed mean-height above the ground; and also that this mean height can be maintained even when traversing the rounded crest of a hill or ridge, or along a gully by virtue of being able to control the roll position of the booms relative to each other at the same time. Thus, the spray booms are better able to follow, at an essentially constant mean height above the ground, any gently varying contours of the ground that occurs across the span of the booms during operation.

Again, according to contemporary practice, there are two recognized methods by which the active control force can be applied to control the mean angular position of the linked pair of booms relative to the ground: one is to react the controlling actuator in roll against the vehicle, while typically incorporating an interposed low spring-rate compliant element, such that the reaction force is rendered at least somewhat independent of the relative angular roll axis position of the vehicle: While the other is to change the lateral position of the combined booms' center of gravity relative to the center-rack's roll pivot support, such that gravitational reaction is used. This latter concept has the advantage of deriving the boom roll control forces entirely independently of the vehicle's instantaneous roll position. This can be achieved, for example, by displacing weights slidably attached to the booms, laterally in order to apply corrective roll forces. One example of such an arrangement is disclosed in WO2012146255, "Active Damping System for a Spray Boom", Maagaard Jorgen, 2012.

On a practical note, one boom design feature that has become almost universally adopted by current wide-span spray boom designs is the "breakaway". This is typically a vertical hinge pivot system applied such that the last outboard 12 to 15 feet or so of the boom, up to the boom tip itself, can pivot back to alleviate damage if the outermost extremities of the boom accidently contact an obstacle, or contact the ground. There are a number of ways that this is achieved in practice, one most common one being of the double pivot "saloon-door" hinge type, where the breakaway section is centered in the fully extended position by pin inclination and gravity or by spring force, or both, so that upon contact with an object, the breakaway section fold back to avoid damage, and re-centers automatically when the object or ground contact has passed.

Another practical adaption often used on wide-span agricultural spay booms are so called "touch-down" wheels. These wheels are attached on legs, one on each boom semi-span below and slightly forward of the booms to avoid interference with the spray pattern, fairly well outboard along the boom span. Their purpose is to prevent the booms from encroaching too close to, or touching the ground in the event of the control system failing to adequately maintain the correct height position of the boom. While such touch-down wheels may prevent obvious damage to the booms in the event the height control system failure, their inclusion might be considered as indication of the inadequacies of current spray boom/control system design and control methodologies and the need to address them.

Structural design is of vital importance to both the affordability and durability of wide-span spray booms. In this respect it is not only the absolute structural strength of the booms that is relevant, but also, and perhaps more critically, the fatigue strength, which on metal boom structures, particularly welded metal boom structures, usually defines the boom's usable life. In this respect the amplitude of the cyclic fatigue loadings applied to the boom, either as imposed loads (from bumps in the terrain reacting the inertia of the boom structure, for example) or as resonance generated loads (from structural modal resonance response) are of great importance. This is because the characteristic fatigue S-N curves (cyclic Strain amplitude verses Number of strain reversals to failure) follows a logarithmic curve with a slope of approximately three, so effectively represents a number of cycles to failure that varies inversely as the cube of the cyclic strain. To put this into perspective, if by the severity of operation, the magnitude cyclic loading forces on a given boom structure were to be doubled, then its fatigue life would be expected to fail prematurely at around just one eighth of its original value. While, on the other hand, if by design, the cyclic loading were to be halved, then the same boom would be expect to benefit by an eightfold increase its life.

The alleviation of fatigue loads by adequate compliant suspension in heave (vertical accelerations imposed when traversing undulating or bumpy ground), in roll (which has been addressed in the foregoing paragraphs), in longitudinal acceleration (acting inertially to flex the booms backwards and forwards on accelerating and braking or climbing or descending gradients) and in yaw (accelerations imposed about the yaw axis by steering the vehicle), is commonly practiced in current designs. In some cases, semi-active control of the longitudinal and yaw accelerations is also currently practiced, while automatically self-leveling the booms relative to the sensed ground position at a pre-set spray height, combined with compliant boom suspension, effectively results in semi-active vertical boom suspension, there still remain some serious deficiencies in structural and fatigue boom design capabilities.

Primarily these relate to the propensity to structural resonance in the (necessarily very flexible) booms excited by vertical and/or longitudinal accelerations in the supporting vehicle due to its operation over rough or undulating ground, even when the best methods of trying to isolate the booms from such critical vibration frequencies have been employed. Such resonant vibrations, magnified by an exciting frequency, can rapidly fail or fatigue the boom's structure prematurely. Further, designing to avoid the critical frequencies generated by the vehicle is largely thwarted by the potentially wide range of frequencies able to be generated due to mass of the vehicle changing on its suspension and tires, as its liquid cargo is discharged during the spraying operation. This is a significant weakness in contemporary high-spans pray booms, and one which will only become worse as economic necessity drives future spray boom spans wider.

The optimal structural design of spray booms typically results in a triangulated braced truss-structure for several reasons. Firstly, the truss type structure is one of the strongest, lightest and most rigid configurations, and secondly, when in the folded position along both sides of the vehicle, the open lattice frame of the truss structure allows the driver a fairly high level of visibility through the structure itself, so enabling safer operation, particularly on roads and highways. The open lattice structure also permits ready access to any plumbing, hydraulics, electrical and communication lines, sensors etc. for maintenance or modular adaptability.

From the foregoing it can be seen that there are a large number of relevant factors that need to be addressed in the optimal design of wide-span spray agricultural booms, and that contemporary designs are deficient in a number of respects.

It is desirable that wide-span spray booms be designed using lightweight high-strength materials, so that the booms' span can be maximized while the structural loads, resulting largely from the boom structural mass, can be kept with the limits defined by the operational life requirements.

It is desirable that, in order to maximize agricultural sprayer utility in terms of area sprayed in unit time that both the boom-span and vehicle speed be maximized; notwithstanding that both these parameters significantly increase the propensity of the boom structure to flexure and resonance.

It is desirable for the boom system to be able to accurately maintain the optimal, near constant, spray height above the ground, and to follow the smooth contours and undulations in the ground surface profile in span at the highest practical vehicle spraying speed.

It is desirable that not merely the limit-load strength of the boom structure, but the fatigue strength of the structure, be primary criteria for spray boom design.

It is desirable that the problem of boom structural resonance, particularly in the vertical and longitudinal vehicle axis directions, be eliminated or reduced to acceptable levels, particularly at the resonant Eigen-frequencies.

It is desirable that the spray boom structure be of the truss or lattice type, so that the vehicle driver's visibility through the structure is not significantly impeded when the booms are in the folded position along both sides of the vehicle.

It is desirable that methodologies to mitigate otherwise excessive loads from being imposed on the booms' structure and attachments to the vehicle due to the vehicle's angular displacements in roll over uneven ground being reacted against the deployed booms' extremely high polar moments of inertia in roll It is desirable that methodologies to mitigate otherwise excessive loads from being imposed on the booms' structure by the vehicle's movement over rough or uneven ground, in the vertical or longitudinal axis directions due to the booms' inertia reacting the vehicle's vertical, longitudinal and yaw displacements.

It is desirable that, in the design of the booms combined with their attachments to their supporting center-rack, along with the center-rack's attachment to the vehicle, that provisions be made to support the use of advanced active boom control methodologies: These are methodologies that enable the booms to follow the varying contours of the ground with a high level of accuracy, without interference from spurious short term vehicle displacements, and with a response time consistent with these objectives.

The present invention serves to overcome these deficiencies.

SUMMARY OF THE INVENTION

The current invention discloses several methodologies that mitigate shock loading and propensity to resonance in agricultural spray boom structures. These include a new form of near-planar linkage instrumental in decoupling the boom assembly from the vehicle in pitch, heave and roll. This serves to permit further aspects of the invention to: Use the combined mass of the booms and center section as the tuned mass of a tuned mass damper that can counter the eigenfrequency of the boom system in vertical resonance (flapping): Act as an enabling part of a boom compliant suspension system to mitigate shock loadings otherwise imposed on the boom system, and: Act as an enabling part of an active boom height and roll control systems to permit the accurate navigation of the boom over undulating terrain. The planar linkage also has application to other devices and uses. Further aspects of the current invention include the incorporation of tuned mass dampers to counter resonance at either the Eigen or tertiary frequencies in the boom structure and components; and the use of the mass and operation of the boom outboard "breakaway" sections as tuned mass dampers to counter modal resonance in the horizontal plane.

There are many advantages of the present invention. Some advantages are:

According to one advantage of the present invention, wide-span spray booms of the present invention are designed using lightweight high-strength materials. This allows the boom's span to be maximized while the structural loads, resulting largely from the boom structural mass, can be kept with the limits defined by the operational life requirements. In order to maximize agricultural sprayer utility in terms of area sprayed in unit time that both the boom-span and vehicle speed be maximized; notwithstanding that both these parameters significantly increase the propensity of the boom structure to flexure and resonance. The fatigue strength of the structure in addition to the limit-load strength of the boom structure should be accounted for in a boom design. Accordingly, an advantage of the present invention is that structural resonance, particularly in the vertical and longitudinal vehicle axis directions, can be eliminated or reduced to acceptable levels, particularly at the resonant Eigen-frequencies.

The resulting fatigue strength and structural strength allow for the booms to have a greater width and the vehicle to travel at a faster speed. This results in greater coverage per unit time.

According to another advantage of the present invention, the spray boom structure is of the truss or lattice type, so that the vehicle driver's visibility through the structure is not significantly impeded when the booms are in the folded position along both sides of the vehicle.

A near planar linkage is provided according to one aspect of the present invention. The near planar linkage can carry weights in a plane without the need for direct contact points such as rollers. It is understood that the motion of an object connected to the linkage can be nearly planar.

According to another advantage of the present invention, the boom system is able to accurately maintain the optimal, near constant, spray height above the ground, and can follow the smooth contours and undulations in the ground surface profile in span at the highest practical vehicle spraying speed.

According to another advantage of the present invention, methodologies to mitigate otherwise excessive loads from being imposed on the boom's structure and attachments to the vehicle due to the vehicle's angular displacements in roll over uneven ground being reacted against the deployed booms' extremely high polar moments of inertia in roll are provided.

According to another advantage of the present invention, methodologies to mitigate otherwise excessive loads from being imposed on the boom's structure by the vehicle's movement over rough or uneven ground, in the vertical or longitudinal axis directions due to the booms' inertia reacting the vehicle's vertical, longitudinal and yaw displacements are provided.

According to a further advantage of the present invention, that in the design of the booms combined with their attachments to their supporting center-rack, along with the center-rack's attachment to the vehicle, that provisions are made to support the use of advanced active boom control methodologies: These are methodologies that enable the booms to follow the varying contours of the ground with a high level of accuracy, without interference from spurious short term vehicle displacements, and with a response time consistent with these objectives.

According to an advantage of the present invention, when a center rack forms a tuned mass damper, the entire boom is damped without adding appreciable weight to the system.

According to another advantage of the present invention, there is a relatively large reservoir coupled with a bag having a small volume. This allows for the bag to provide a near constant force to support the boom.

Further, the near constant force element is coupled with dampers in parallel to eliminate low rate of oscillation in booms. Hence, the entire boom is damped.

According to a further advantage of the present invention, the angle of the center rack (and hence the booms) can be controlled by an internal pump. A controller controls an internal pump to direct air (and hence change pressure) to rotate the boom assembly to the left or right side boom. This is accomplished without adding or removing air (or a gas or a working fluid) from the system. The internal pump switches direction of pumping as often as needed to maintain the desired boom angles.

According to another advantage of the present invention, a positional link is provided. The positional link can tilt a secondary section of boom relative to the first section of the boom to maintain a desired spray height. Articulation can be done in real time by the use of sensors and a controller.

According to another advantage of the present invention, a tension gas spring is provided. The tension gas spring inverts action a compression gas strut to form a tension gas spring. This allows an embodiment of the present invention to pull two objects towards each other.

Damping is provided as two arms pull back towards each other in latter portion of return of the gas strut. It is appreciated that there isn't any appreciable damping as the arms separate from each other, thereby allowing freedom of outward motion.

In use, two tension gas springs can be used with a breakaway section of a boom to turn the break away into a tuned mass damper. In this regard, depending on the direction of the swing, one of the two tension gas springs can first separate (without damping) and then provide a damping effect upon the latter part of the return. Hence, there will be one active damper and one inactive damper depending on the direction of the swing of the breakaway relative the adjacent boom section.

Another advantage of using the breakaway section as a tuned mass damper is that it does not add appreciable weight to the boom.

According to another aspect of the present invention, a tuned mass damper can be bolted or otherwise connected to the boom. This advantageously can address specific problems in primary and secondary (or tertiary) modes remedially (i.e. if they appear).

According to another advantage of this aspect of the present invention, the tuned mass damper can be designed so that a single mass can damp in both the vertical and horizontal directions.

According to another advantage of the present invention, the tuned mass dampers can be passive or active. In an active damper, such as a coil and magnetized mass, the user can selectably turn on the damper as necessary.

Other advantages will become apparent by studying the following detailed descriptions and the drawings.

BRIEF DESCRIPTION OF THE DRAWINGS

FIG. 24A is similar to FIG. 24 but shows a cover in place.

FIG. 25A is similar to FIG. 25 but shows a cover in place.

DETAILED DESCRIPTION OF THE INVENTION

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Figure 1:
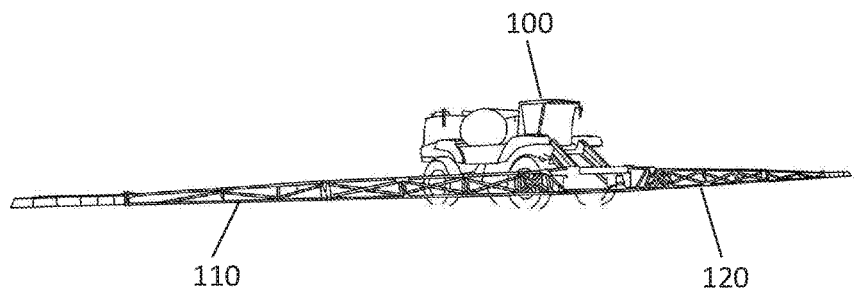
FIG. 1 is a perspective view of an existing agricultural spray vehicle and boom system in operating position to which the current invention may be applied.
Figure 2:
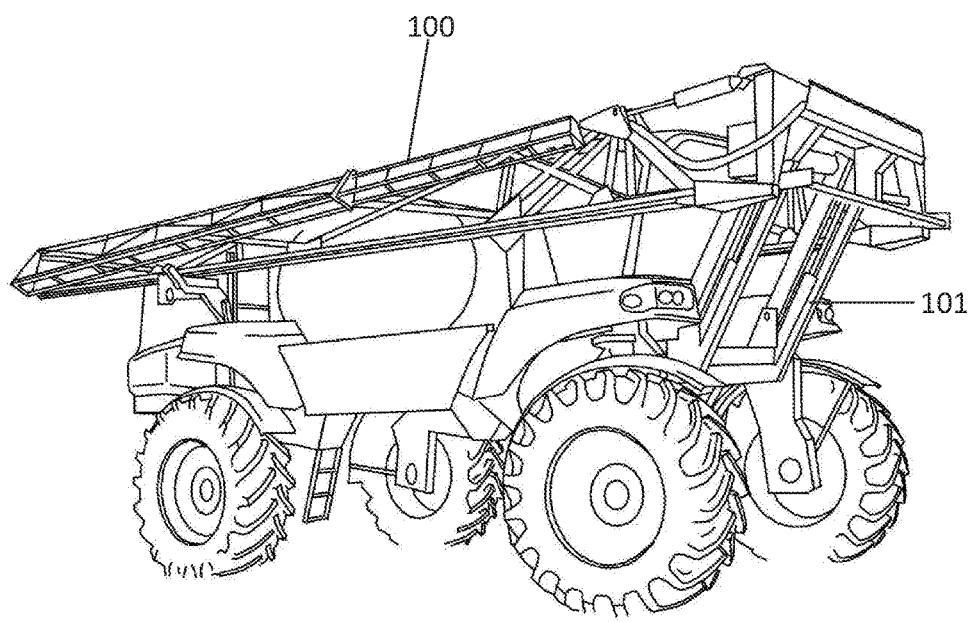
FIG. 2 is a perspective view of an existing agricultural spray vehicle in folded and boom system, to which the current invention may be applied, with the booms in the stowed position.
Figure 3:
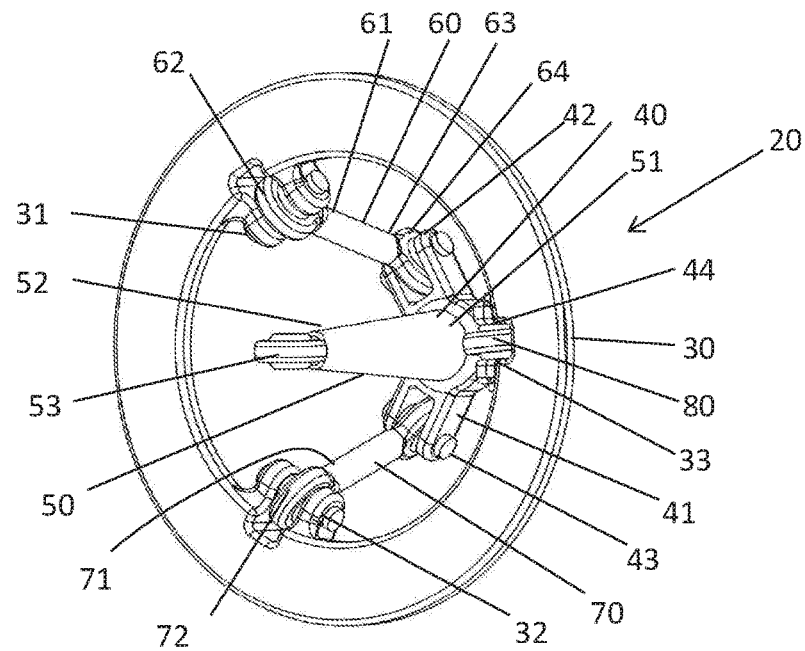
FIG. 3 is a perspective view of an embodiment of a near planar linkage.
Figure 4:
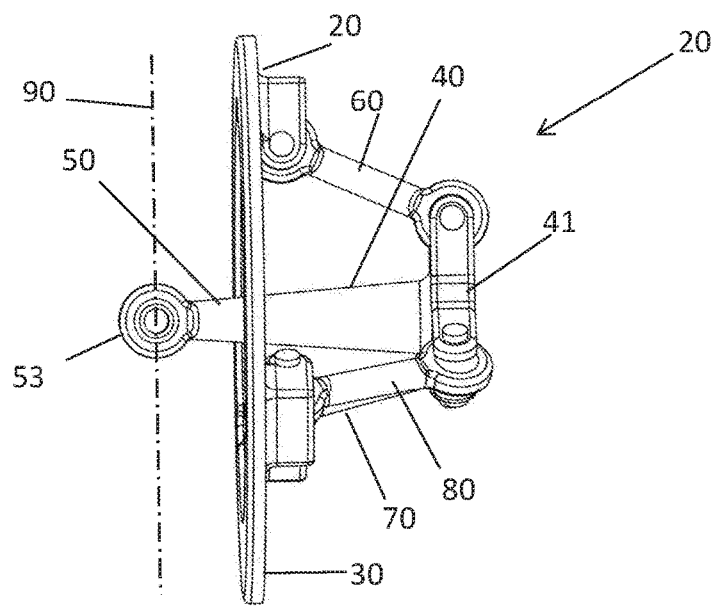
FIG. 4 is a side view of the embodiment illustrated in FIG. 3.
Figure 5:
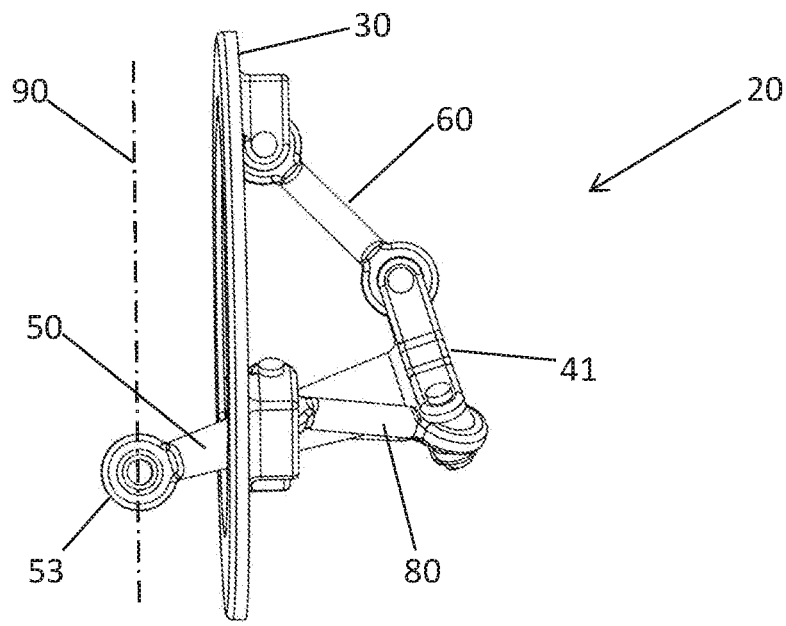
FIG. 5 is similar to FIG. 4, but shows a strut moved away from the centered position but maintaining a position in a similar plane.
Figure 6:
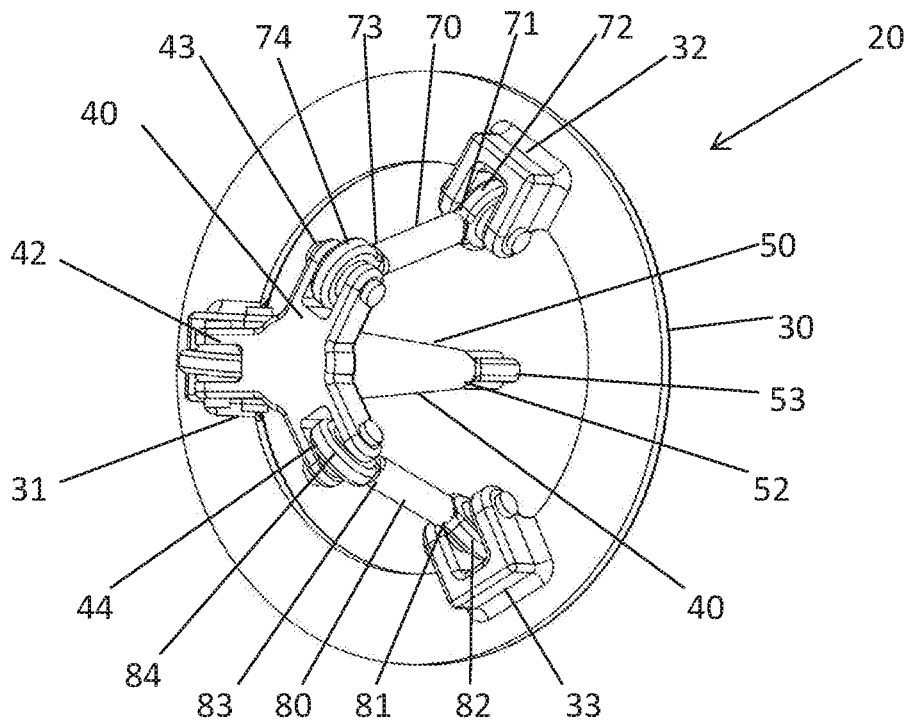
FIG. 6 is a rear perspective view of the embodiment illustrated in FIG. 3.
Figure 7:
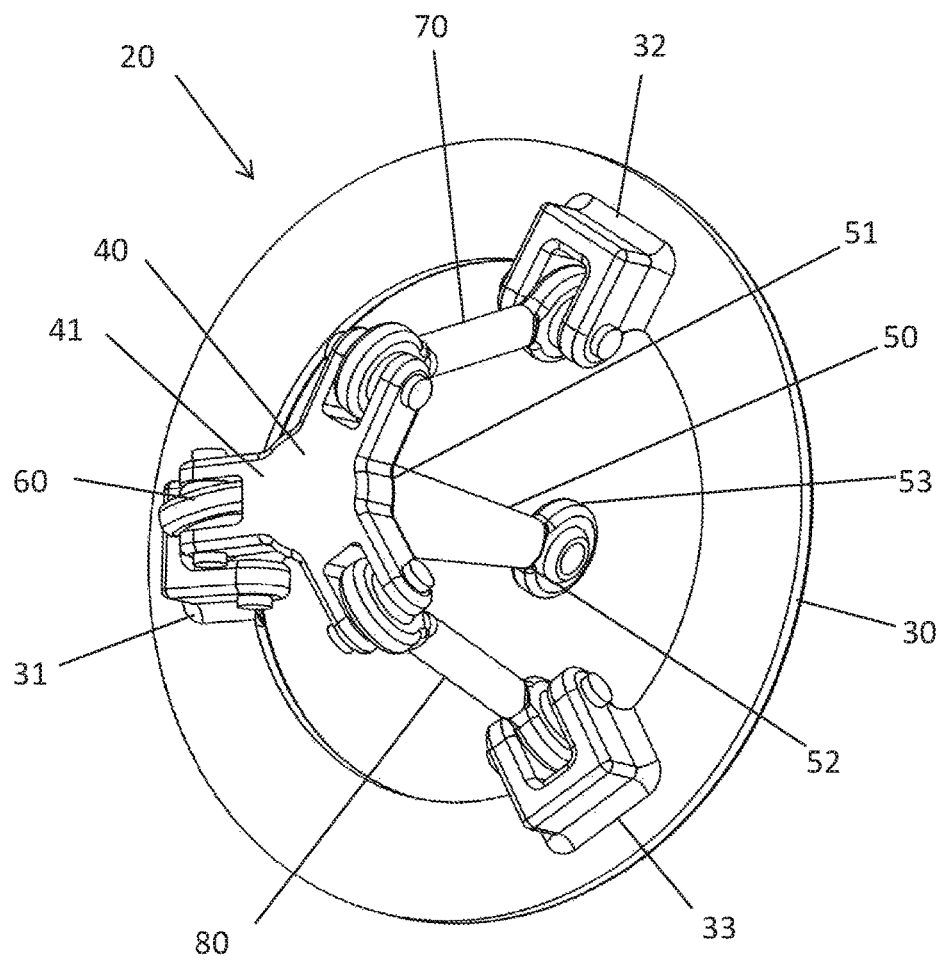
FIG. 7 is similar to FIG. 6, but shows a spherical joint at the distal end of the strut in an alternative orientation.
Figure 8:
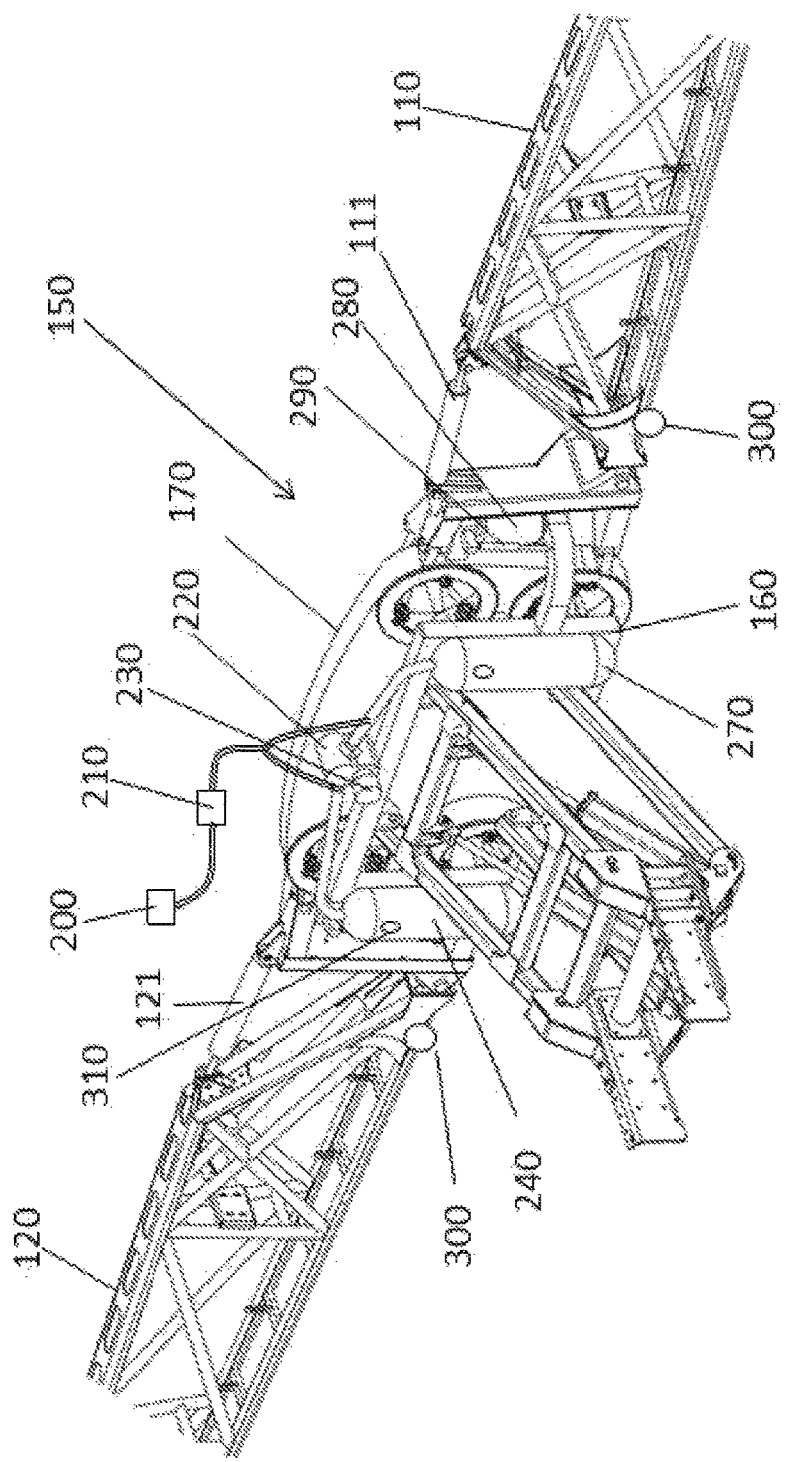
FIG. 8 is a perspective view of an embodiment of a support assembly including a center rack incorporating near planar linkages.
Figure 9:
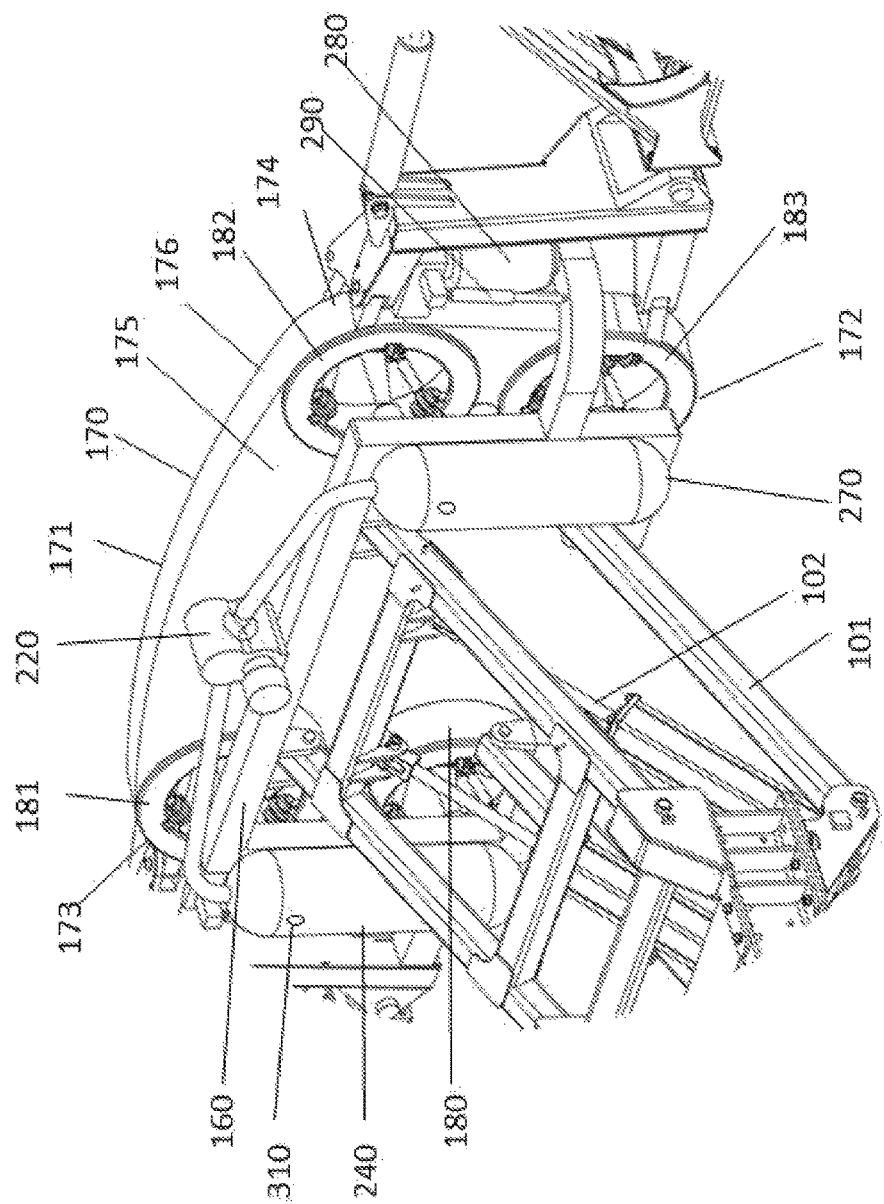
FIG. 9 is an alternative view of the embodiment shown in FIG. 8.
Figure 10:
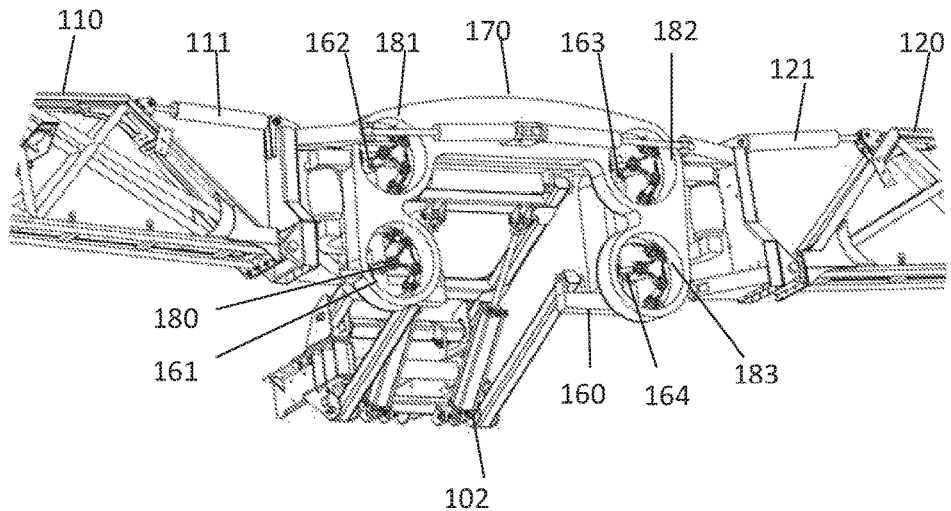
FIG. 10 is an alternative view of the embodiment shown in FIG. 8.
Figure 11:
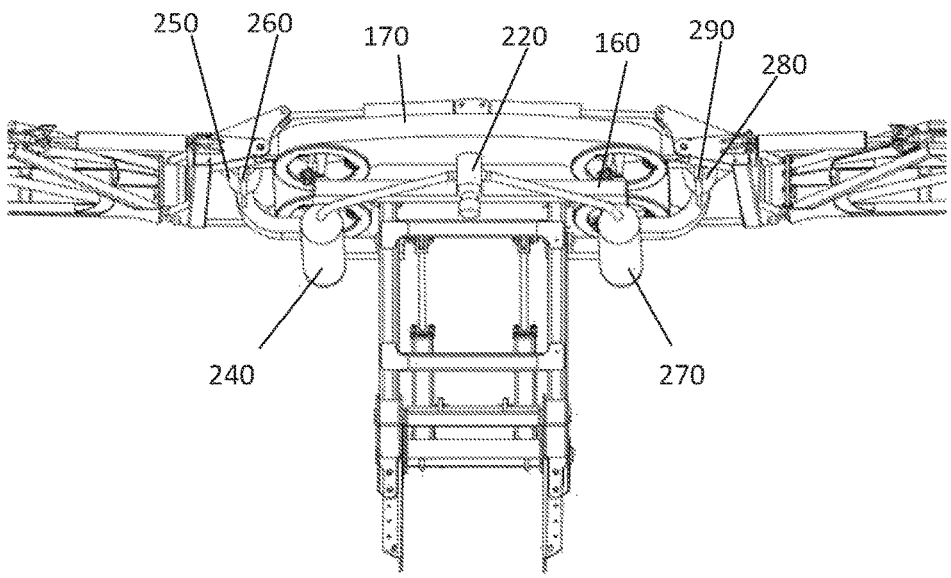
FIG. 11 is an alternative view of the embodiment shown in FIG. 8.

Referring now to the invention in more detail, FIGS. 1 and 2 show the booms mounted in position on a vehicle. FIG. 1 shows them as they would be in the deployed in the full-span and part-span operating position when used for spraying crops, while FIG. 2 shows the invention in its folded position as it would be used for driving to and from the fields being sprayed, maneuvering through field entrances gates, along tracks or on roads or highways. Unless otherwise noted, the booms 110 and 120 shown in the various embodiments of the current invention comprise three primary identifiable segments: The primary or inner boom, the secondary or outer boom, which incorporates a breakaway.

In order to decouple the entire boom system and center-rack from the vehicle in pitch heave and roll, the current invention incorporates multiple near planar linkages, or near planar link mechanism, 20. These linkages are seen in FIGS. 3-7.

Each near planar linkage 20 has a body 30 with three body joints 31, 32 and 33. A center arm 40 is provided having a base 41 with three center arm joints 42, 43 and 44. A strut 50 upstands from the base 40. The strut 50 has a proximal end 51 and a distal end 52. A spherical joint 53 is at the distal end 52 of the strut. A link 60 is provided. A spherical joint 62 is at a first end 61 of the link, and a spherical joint 64 is at the second end 63 of the link. A link 70 is provided. A spherical joint 72 is at a first end 71 of the link, and a spherical joint 74 is at the second end 73 of the link. A link 80 is provided. A spherical joint 82 is at a first end 81 of the link, and a spherical joint 84 is at the second end 83 of the link.

The links 60, 70 and 80 interconnect the body 30 and center arm 40. The first end spherical joint 62 of link 60 is connected to the first body joint 31. The first end spherical joint 72 of link 70 is connected to the second body joint 32. The first end spherical joint 82 of link 80 is connected to the second body joint 33. The second end spherical joint 64 of link 60 is connected to the center arm joint 42. The second end spherical joint 74 of link 70 is connected to the center arm joint 43. The second end spherical joint 84 of link 80 is connected to the center arm joint 44.

It is understood that the center arm 40 can more relative the body 30. The distal end 52 of the strut 50 moves generally in an approximate plane 90.

The central arm in one example can have a length of about 12 inches measured from the center of the spherical joint at the distal end to the plane of the pitch circle diameter (PCD) of the three other spherical joints at its large end. Relative to the central arm length, the link lengths center to the center of the spherical joints can be approximately 0.63; the center rod lard end PCD of the three spherical joints is approximately 0.67; and the large ring PCD of the three spherical joints is approximately 1.17.

Stated in more particularity, the near planar linkage comprises three links each of which is attached at one end by a spherical joint to a main body or support 30 at three approximately equi-distant attachment locations, and to one end of a mid-positioned, longer strut, via three approximately equi-spaced spherical joints. By way of definition, it can be stated that the center strut, having the three links attached at one end as shown, and a single spherical joint at its distal end, has a longer distance between the plane of the pitch circle diameter of the spherical attachments at its large end to the center of the spherical joint at its distal end, than the length of the three links between their spherical joint centers: The pitch circle diameter of the spherical attachments on the main support is larger than the pitch circle diameter of the three spherical attachments at the end of the center strut. The length of the three links, spherical joint center to spherical joint center, is less than the pitch circle diameter of the centers of the three spherical joints on the larger end of the center-strut. Configured appropriately, the path that the center of the spherical joint at the distal end of the center-strut follows always remains closely planar to the plane that passes through the pitch circle diameter of the centers of the three spherical joints on main support. However, it is not a perfect planar linkage; there must always be some small deviation: There is so single perfect mathematical solution. The mathematical method by which the geometry of the near-planar linkage is generated therefore one of iterative "Design of Experiments" applied typically using computing processes such as Matlab, Mathcad or bespoke computer programming. For this particular embodiment of the invention, which is not necessarily fully optimized in planar movement and which permits a 12 inch inclusive movement of the center of the spherical joint at the distal spherical joint in all directions, that geometrical deviation is just seventy two thousandths of an inch. This small deviation is considered insignificant in terms of the relative flexibility achievable in the supporting structure of the center-rack to which it is applied in this particular usage.

While the foregoing depicts just one embodiment of the near planar linkage used in this particular context, there are numerous potential adaptions that would also be considered to benefit from the use of the concept, A particular aspect is that this specification uses the term "spherical joint" as a way of defining the function of a joint mechanism. Clearly, the effect of a spherical joint function can be simply replicated by the use of multiple revolute joints, for example, a universal, or Hook's joint; a roller ball joint, CV joint, recirculating ball or roller joint, or indeed, any elastomeric joint configured to achieve the same objective: These are all considered to be synonymous and inclusive with the term "spherical joint", for the purposes of this specification, as they allow rotation in all directions.

These include the application of such a planar linkage to the support of major structures such as high-rise buildings in earthquake prone geographical zones, the general enhancement of tuned mass damping technology, and vehicle suspensions, also expounded in this patent specification, and in many advanced technological areas.

Turning now to FIGS. 8-11, it is seen that a support assembly 150 is provided to connect to a vehicle 101 four bar linkage 102. The vehicle has a lift actuator 102. The vehicle can have a first boom 110 with an angle actuator 111 for controlling an angle of the boom relative to the center rack and a second boom 120 with an angle actuator 121 for controlling an angle of the boom relative to the center rack.

The support assembly 150 has a center rack support frame 160. Support frame 160 has four connectors 161, 162, 163 and 164. A center rack 170 is further provided having a top 171, a bottom 172, sides 173 and 174, a front 175 and a rear 176. A plurality of near planar linkages, preferably four such linkages 180, 181, 182 and 183, are provided. The four linkages are removably secures to the connectors of the support frame, wherein the center rack can move within a plane relative the support assembly without appreciably changing the distance between the components, namely the support frame 160 and the center rack 170.

Several other components are provided, including a controller 200, a feed pump 210, an internal pump 220, and a motor 230 for driving pump 220. A reservoir 240 connected to an air bag 250 with a conduit and a damper 260 parallel with the expansion axis of the bag is further provided. A reservoir 2770 connected to an air bag 280 with a conduit, and a damper 290 parallel with the expansion axis of the bag is further provided. It is appreciated that the volume of the reservoirs compared to the distance the bags are inflated result in a near constant force element being provided to support the booms. The conduits between the reservoirs and bags can be located inside of other components or outside. The pump 220 can rapidly change direction causing the left or right side bags to selectably inflate or deflate (without changing the amount of gas in the system) and accordingly raise the left boom or right boom angularly relative via center rack positioning while the opposite boom is lowered angularly.

Height sensors 300 are preferably located at the root end of the primary section, the outboard end of the secondary section and the outboard end of the breakaway section on each side boom. Hence, it is preferred to have six sensors. Of course, the number and location of the sensors 300 could change without departing from the broad aspects of the present invention. A pressure sensor 310 can also be provided to measure pressure on each side of the center rack within the reservoirs.

As discussed with more particularity, it is seen that a center rack 170 incorporating four of these planar linkages 180, 181, 182 and 183, one at each corner, is provided. Each of these planar linkage center struts are attached, via the spherical joint at the distal end of the center-strut, to the support frame connected to the vehicle by the conventional four-bar lift linkage. Thus it may be observed that if the center-rack's mass were to be suitably supported, then it would be free to move vertically, horizontally and in angular translation about the vehicle's longitudinal axis, within the movement limitations of the planar linkages, while being constrained in all other degrees of freedom. While four planar linkages are shown, the present invention is not limited to utilizing four such linkages.

The center rack 170 with booms attached, being restrained by the four planar linkages as described, above, but with the weight of the boom assembly being reacted by two resilient suspension elements. These suspension elements can be mechanical springs, gas struts, liquid springs, hydraulic struts connected to compressed gas accumulators to act as springs, air springs, Near Constant Force (NCF) elements or any other type of resilient element that would reduce the shock loads that would otherwise be imposed on the boom assembly by vertical or roll displacements of the vehicle. These two spring elements may also be mounted in parallel with dampers, in much the same way that car suspension springs and dampers are configured to prevent resonance of the suspended mass (the center-rack and booms) by converting resonance momentum into heat, and dissipating it to their surroundings.

In one specific embodiment of the invention, the spring elements are gas springs configured to act as low K springs, that is, having a very small increase in spring force with displacement. This is achieved by the entrapped volume of the springs being large in relation to the swept volume displaced for a given spring movement. These gas springs 250 and 280 may take the form of air-bags similar to those often used for heavy truck and trailer suspension systems, but to increase the displacement/volume ratio, an additional closed reservoir volume may be attached to the airbag via a large bore connecting pipe (to minimize flow losses). Configured in this way, the effective K value of air springs may be lowered to the point that the spring system may be regarded as a Near Constant Force (NCF) element. Very low spring rate and NCF elements are advantageous in isolating or decoupling the suspended mass of the boom system from spurious movements of vehicle, but since they have little or no convergent restoring force, they require some form of active control to keep the boom system with the planar linkages limits of operation.

It should be noted that any lateral forces that would otherwise cause the center-rack and booms to displace sideways under lateral accelerations imposed by the differential vertical movements of the wheels on either side of the vehicle, combined with the height of the boom and center-rack system above the ground, may be countered by spring elements and dampers, positioned to act laterally to restrain the center-rack relative to the center-rack support frame. The vertical position of these spring restraints may be constrained to be approximately coincident with the combined booms/center-rack assembly vertical center of mass in order to minimize spurious vertically acting forces from being imposed on the center-rack under lateral loadings or in side slope operation. In another variation of this embodiment of the invention, two airbag spring elements, instead of the single restraining spring are mounted at each side of the center-rack to restrain it.

Two airbag type low spring (K) rate or NCF elements supporting the suspended mass of the center-rack and boom system can be provided. Height level sensors are fitted to each side of the center-rack, so that the height of each end of the center rack relative to the center-rack's support frame can be determined; accordingly their two signals can be computed to provide a combined mean rack height position. That is to say that the mean height level can be known, irrespective of the any angular displacement in roll between the decoupled center rack and boom system and the vehicle mounted boom support frame. Also, the (typically) two actuators (usually hydraulic cylinders) that are fitted to the vehicle's four-bar linkage that raise and lower the center-rack and boom assemblies en-mass, are fitted with positional transducers (typically linear transducers) that enable the center-rack height position to be computed at any time. Further, the two inner booms are furnished with a multiplicity of ground proximity height sensors 300, with at least one sensor at each end of each inner or primary boom section, to measure the height above the ground. Similarly, the secondary and breakaway boom sections are also fitted with ground height proximity sensors: At least one at, or towards the outboard end of the secondary boom section, or on the breakaway section, or both.

Additionally, either pressure sensors are fitted to each of the air bags to measure the dynamic air pressure within them, or force sensors are used to measure the dynamic force being applied or reacted by each of the two air bags into the boom structure.

The enclosed volumes of the two airbag springs are interconnected by a large bore tube and a high throughput, bi-directional, positive displacement air pump 220, such as a Roots pump, is interposed in this interconnecting line, such that when driven in one direction of rotation, air is displaced from the left side airbag into the right side air bag, and when rotated in the opposite direction, air is pumped in the opposite direction, from the right side airbag into the left side air bag.

A further, smaller positive displacement leveling pump 210, serves to pressurize the whole boom suspension system, while control valves are fitted to operate in conjunction with the leveling pump to increase or decrease the mean pressure within the enclosed volume of air within the airbags, interconnecting pipe and bi-directional positive displacement pump.

In operation, the entire boom system is supported by the two airbag springs, which are pressurized by the leveling pump to lift the center-rack and booms to the correct mean height to optimize the available movement of the four planar linkages. The leveling pump may be driven electrically from the vehicle's electrical supply, or driven by a hydraulic motor from the vehicles hydraulic supply. The leveling pump may exhaust into a pressurized air reservoir or accumulator from which the control system monitors and controls the pressurized air leveling supply to the enclosed boom suspension system by means of the valves mentioned earlier. Either way, the leveling operation may be controlled electronically using signals processed from positioning sensors mounted between the center-rack and the vehicle mounted support frame to control the pressurized airflow into and out of the enclosed system volume. In an alternative embodiment, a mechanically operated leveling valve, as used to self-level the ride-height of commercial vehicles may be employed.

Again, in operation, once the center hack height has met, and is being maintained at the required mean dynamic height position, then signals from the ground height sensors, mentioned in this specification in the section "Background to the Invention", mounted on the boom inboard or primary boom sections, are used dynamically level the booms relative to the ground. This is done by electronically analyzing the relative inboard boom heights above the ground, generating the required (dynamic) set point and deviation signals, and driving the positive displacement pump in the appropriate direction to change the relative forces being monitored and applied to each of the airbags in order to permit the boom systems weight and mass to effectively drive the boom in angular displacement on an axis parallel to the vehicle's roll axis, to cause the boom system to roll, en-masse, towards the dynamic set point where the inner booms on both sides of the vehicle are at the same height from the ground. Of course, the inertia of the booms will typically cause the boom movement to pass the set point, whereupon the direction of rotation of the positive displacement pump will be reversed to correct, and the booms will continuously be "balanced" in this manner, back and forth, although almost imperceptibly, such that the inner boom sections will remain at equal height above the ground on both sides of the vehicle, irrespective of the undulations and topographical contour changes of the ground profile.

Now, achieving the dynamic balance of the inboard boom sections at equal heights above the ground is only part of the requirement of a boom system. If the vehicle is passing through a gully where the ground profile will rise up on either side of the vehicle, or along the top of a ridge where the ground profile will slope down on either side of the vehicle, simply having a straight boom span maintaining equal heights both sides of the vehicle, could prove inadequate. In the former condition, the gully, not only could the greater part of the booms be below optimal height for spraying, but the outboard sections of the booms could actually impact the ground: In the latter condition, the ridge, the outboard sections of the boom could be so far above the optimal spray height that the spraying operation could be almost ineffective. Accordingly, essentially simultaneously with the balancing of the complete boom and center-rack assembly to equal mean height above the ground on both sides of the vehicle, each of the two secondary boom sections is arranged to pivot in the region of their folding hinge point to the inner, or primary boom sections, upwards and downwards about longitudinally disposed pivot axes (in the operating mode): That is, that the primary and secondary boom sections can be articulated relatively to each other to increase or decrease their dihedral/anhedral angle as required to maintain the secondary at the correct mean height above the ground irrespective of the complex and varying span-wise contours of the ground, and the dihedral/anhedral positioning of the inboard boom sections which result from their own contour following capabilities.

Figure 12:
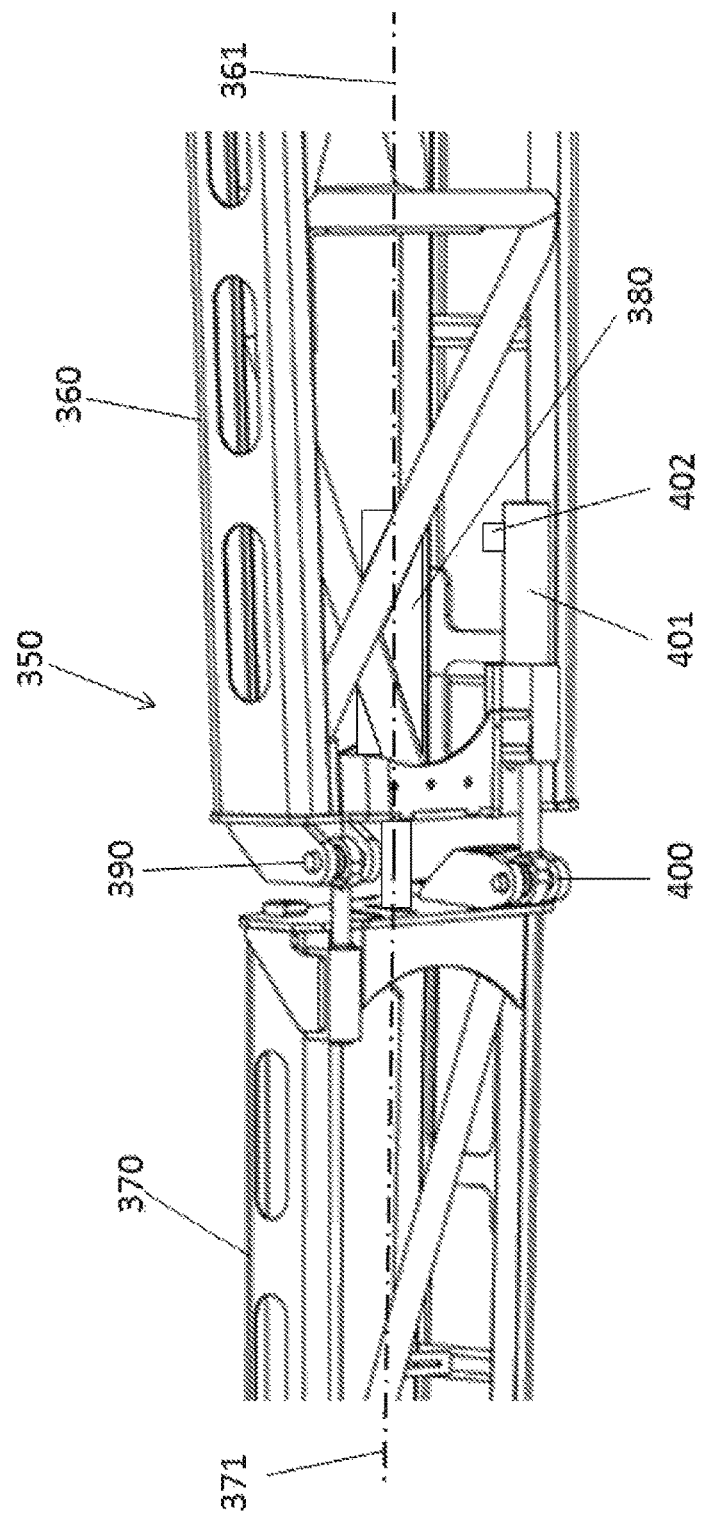
FIG. 12 is a perspective view showing an embodiment of a positional connector of the present invention.
Figure 13:
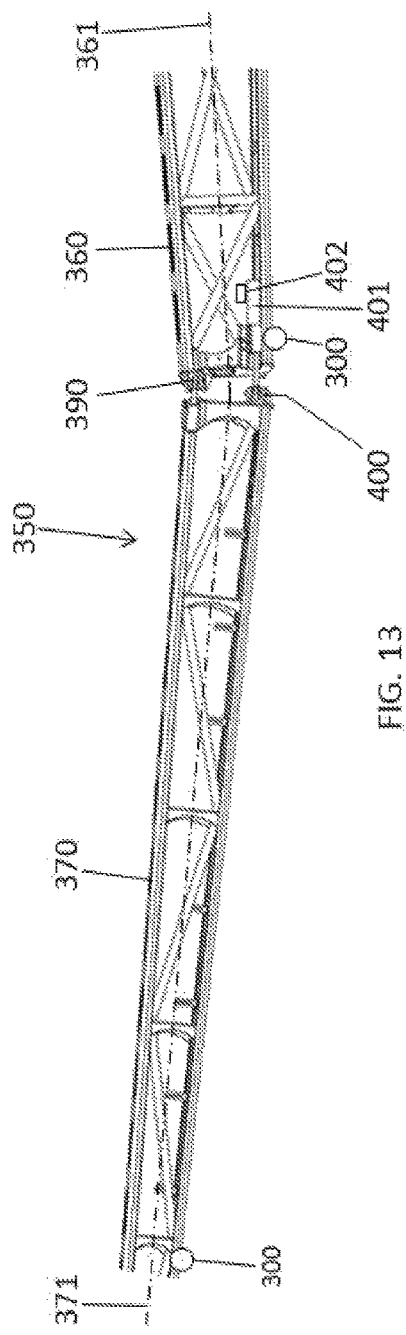
FIG. 13 is similar to FIG. 12, but shows the second boom section in an elevated angle relative the primary boom section.
Figure 14:
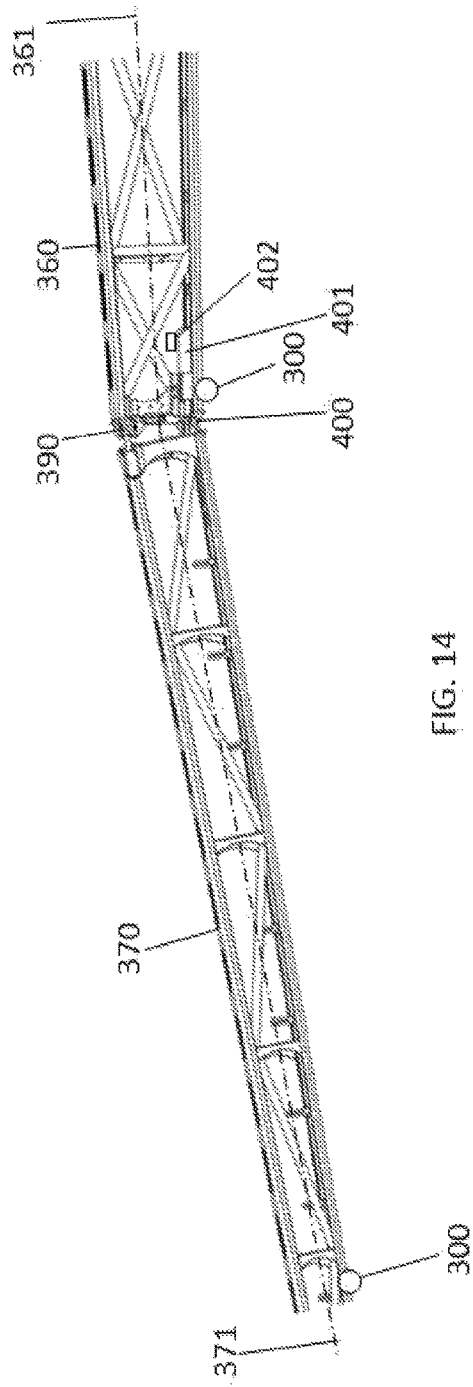
FIG. 14 is similar to FIG. 12, but shows the second boom section in a declined angle relative the primary boom section.

Turning now to FIGS. 12-14, it is seen that a positional connector 350 is provided. The connector 350 connects a primary boom section 360 with longitudinal axis 361 to a secondary boom section 371 with longitudinal axis. A folding actuator 380 is shown schematically, which is used to fold the secondary boom section relative to the first boom section. A top pivot 390 and a bottom pivot 400 are provided. The top pivot is a pivotal connection of a fixed length. The bottom pivot 400 has an actuator 401 and a positional control 402. The pivot is rotational as well as linearly adjustable. The actuator can have a predetermined stroke, wherein at one end of the stroke the secondary boom section 370 is held on an inclined plane or orientation relative to the primary boom section 360. Yet, when the actuator 401 is at the other end of the stroke, the secondary boom section 370 is held at a declined plane or orientation relative to the primary boom section 360. The secondary boom section 370 can further be oriented wherein its longitudinal axis 371 is generally parallel to the longitudinal axis 361 of the primary boom section at a point intermediate the two actuator stroke ends. It is appreciated that the actuator 401 can be controlled by the controller 402 to make adjustments in real time based on inputs from height sensors. Actuator 401 is preferably a hydraulic actuator.

Stated more particularly, in operation, the ground proximity sensor 300, or sensors mounted at the outboard end of the secondary boom section and/or breakaway measures the height of the outboard end above the ground. The controller 200 compares this value with the height sensor at the outboard end of the inner or primary boom section, and a deviation signal generated. The controller in turn corrects the dihedral/anhedral angle of the outboard boom section and breakaway relative to the boom inboard section by controlling the hydraulic actuator between the two sections, such that outboard end of the secondary and or breakaway boom sections is brought to similar height above the ground to the outer end of the primary section.

Figure 15:
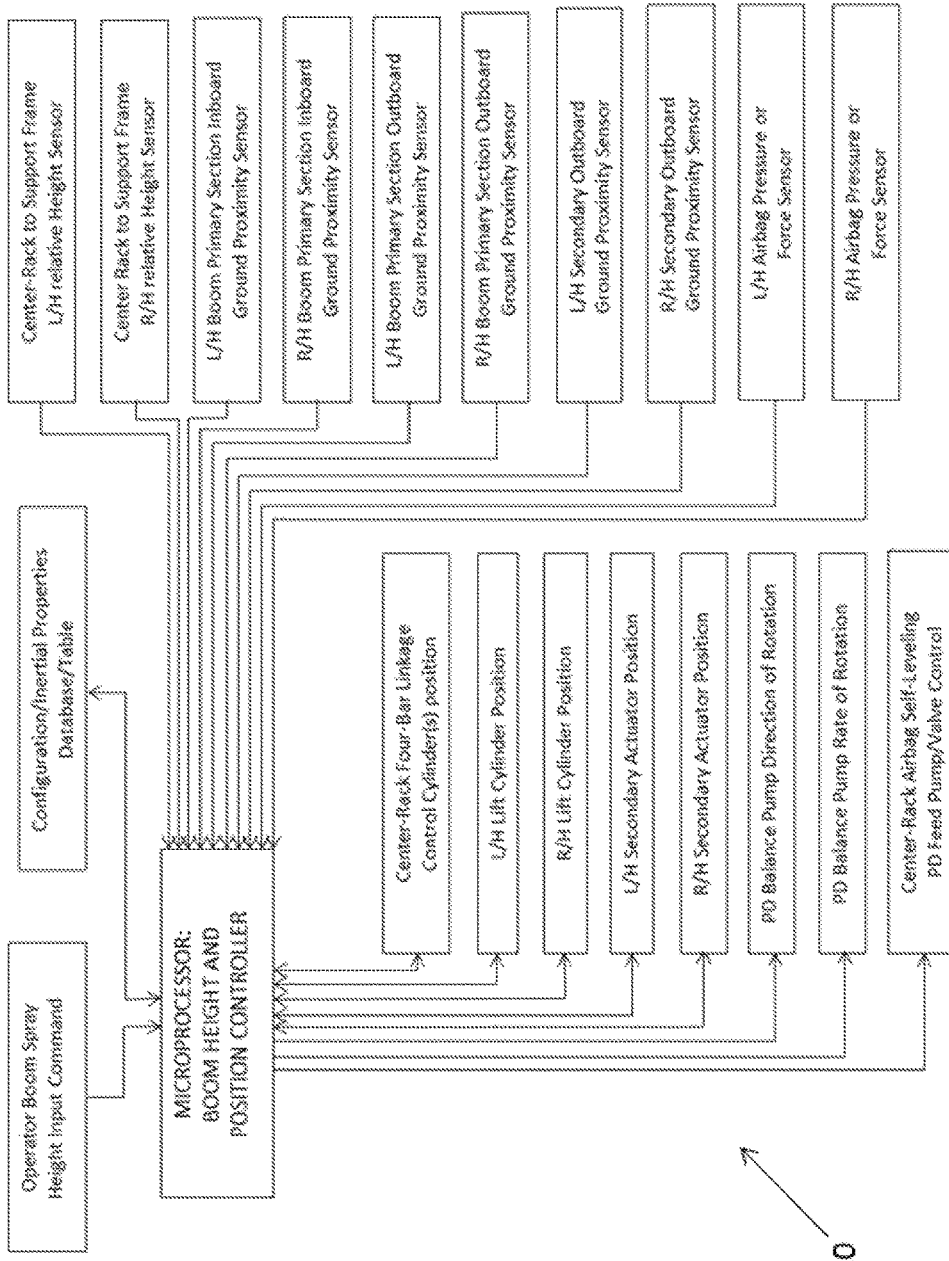
FIG. 15 is a high level flow diagram of the controller operation.

Turning now to FIG. 15, it is seen that a high level flow diagram 420 of a control system for this particular embodiment of the invention. FIG. 15 shows the generic type and location of the minimum number of sensors required to operate the boom leveling and control system. The right hand column shows the generic type of input sensors while the lower left column shows process actions with some feedback signals. The top configuration table is incorporated to account for significant changes in operational inertia data, such as operating the booms in their short span semi-folded configuration, or to permit the folding and unfolding of the booms under full control while the vehicle is moving.

In another embodiment of the current invention, any propensity of the boom whole boom system to resonance in the vertical or "flapping" mode, particularly at its Eigenfrequency may be countered by turning the boom system itself into a tuned mass damper, tuned to its own first-order natural frequency, This is achieved by arranging for the spring rate (K) of the combined airbags at the center-rack that support the mass of the boom/center-rack system, to have closely the same natural frequency as the boom span itself. The planar linkages allow the free vertical displacement of the center rack to achieve the necessary freedom of movement. The dampers that are in parallel with the airbags then serve to dissipate the energy of the resonance—in the manner and function of a tuned mass damper—to reduce the amplitude of resonance to a much lower and far less destructive level. The system may be tuned by proportioning the suspending airbag springs appropriately during the design to give the appropriate spring rate and/or adjusting the internal volumes of the air reservoirs attached to each airbag by means of an adjustable piston at the closed end of the reservoir, or by having a hydraulically displaceable diaphragm within the reservoir and pumping the oil entrapped behind the diaphragm in or out in order to vary the internal air volume of the reservoir.

This concept is very attractive, since the booms become effectively become their own tuned mass damper, but without having to add an additional mass which, of course would be necessary with the more conventional approach to tuned mass damping. Such systems can be readily modelled, indeed reduced to practice, by using Finite Element Analysis (FEA) to determine the Eigenfrequency of the vertical flapping mode of resonance of the boom system, and multibody dynamics software, such as ADAMS, to model the TMD damping effect.

Figure 16:
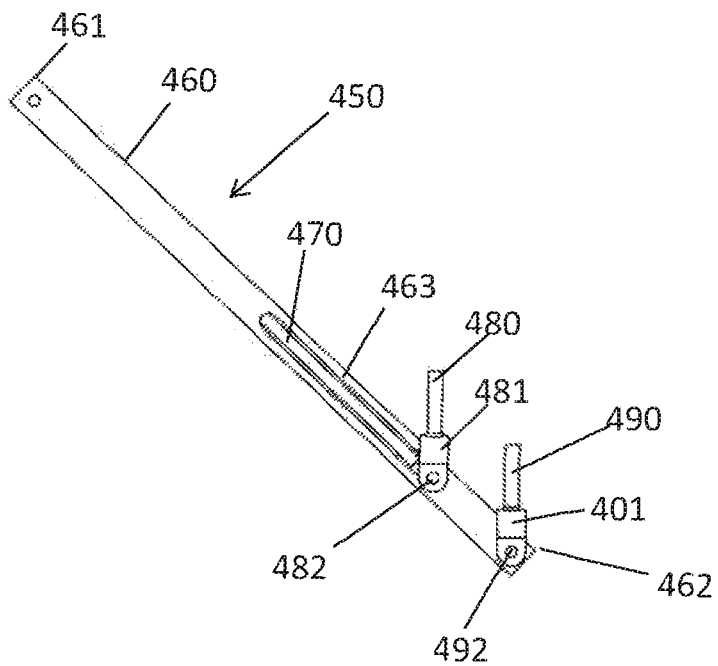
FIG. 16 is a side view of an embodiment of a tension gas spring.
Figure 17:
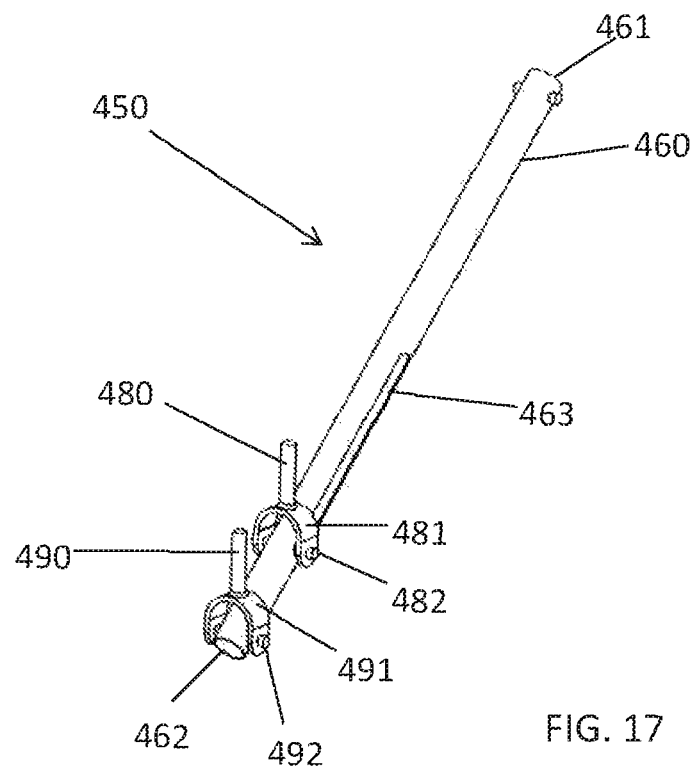
FIG. 17 is a perspective view of the embodiment illustrated in FIG. 16.
Figure 18:
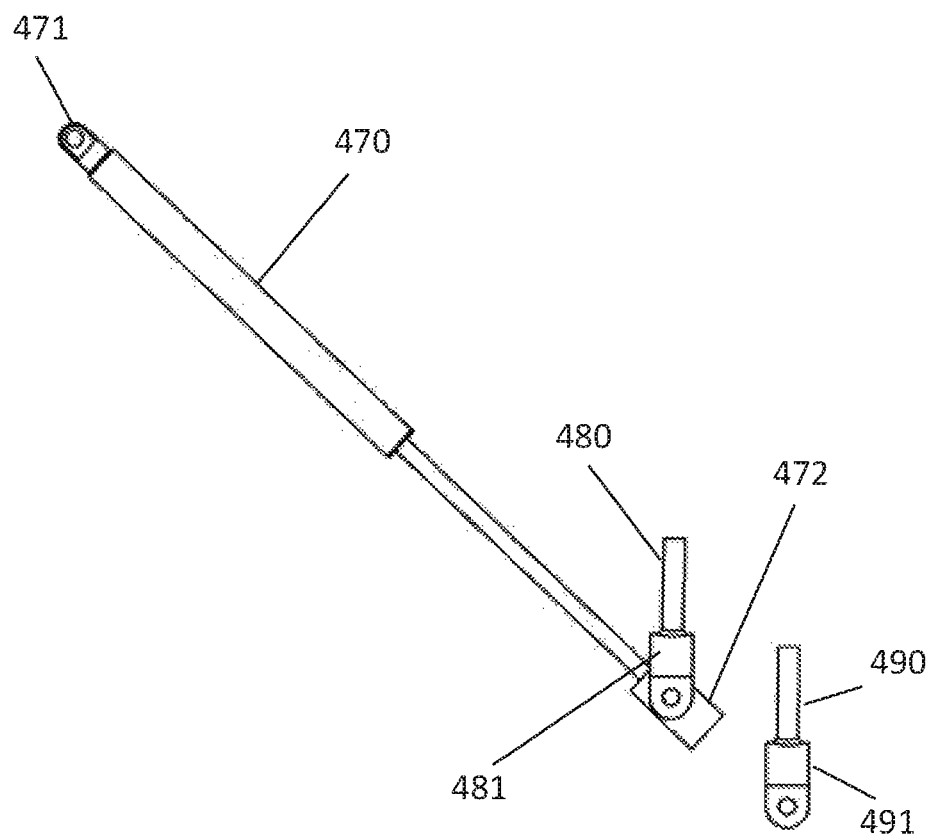
FIG. 18 is a side view showing the internal components of the embodiment illustrated in FIG. 16.

Turning now to FIGS. 16-18, it is seen that a preferred embodiment of a tension gas spring 450 is provided. The tension gas spring 450 has a housing 460 with two ends 461 and 462. A slot 463 or other type of opening is provided spanning generally longitudinally along one or two sides of the housing 460. A gas strut 470, preferably a compressive gas strut with a damping components, is provided and is fixed at the top end 461 of the housing. The strut 470 has a first end 471 and a second end 472. The first end 471 is preferably pinned to the housing 460 at or near the first housing end 461. It is preferable that the seal is oriented down wherein the damping fluid can cover the seal when the unit is stored to preserve the integrity of the seal. The opposite end 472 of the actuator can move along a longitudinal axis relative to the housing. An arm 480 is pivotally connected to the second end 472 of the strut. A stirrup 481 can be connected to the end 472 with a bolt. A second arm 490 is pivotally connected to the second end 462 of the housing in a fixed longitudinal position. A stirrup 491 and bolt 492 are used to connect the arm 490 to the housing. It is understood that the stirrups are pivotally connected to the arms allowing for rotation there between. While stirrups are shown, it is appreciated that alternative connective structures could be used without departing from the broad aspects of the present invention.

In use, a force can be provided to force the arms away from each other (within the constraints of the gas strut or spring). There is preferably little or no damping provided in this direction. However, the tension spring 450 of the present invention applies a return force to the arms (biasing them towards each other) and provides an amount of damping at the latter end of the return stroke. The amount of damping can be determined by a variety of factors relative to the compressive gas shock used in tension spring.

Figure 19:
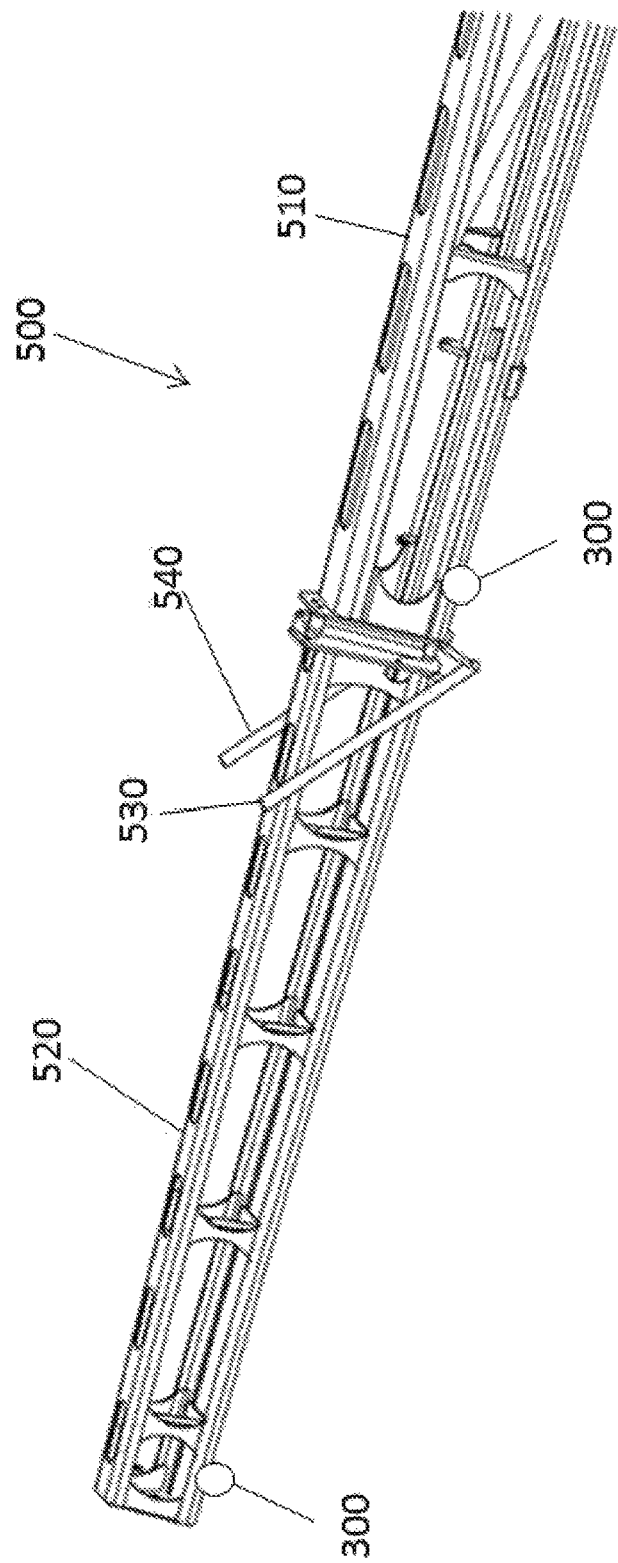
FIG. 19 is a perspective view of a breakaway tuned mass damper.
Figure 20:
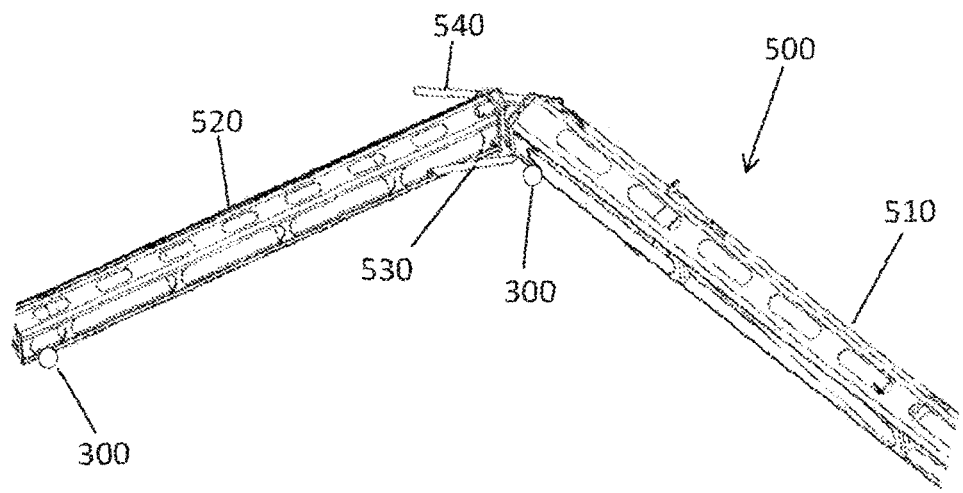
FIG. 20 is similar to FIG. 19, but shows the breakaway swung in a first direction.
Figure 21:
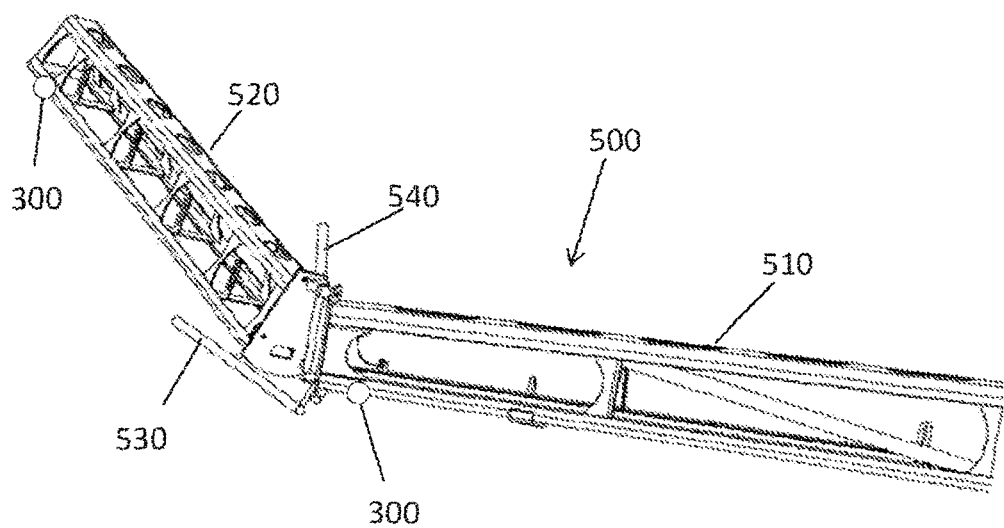
FIG. 21 is similar to FIG. 19, but shows the breakaway swung in a second direction.

Looking now at FIGS. 19-21, it is seen that a breakaway section tuned mass damper 500 is provided to damp boom resonance in the fore and aft flapping mode. The breakaway section tuned mass damper 500 has a secondary boom section 510, a breakaway boom section 520 and two tension springs 530 and 540. Spring 530 is on one side of the boom with one arm connected to each boom section. Spring 540 is on the opposite side of the boom and also has one arm connected to each boom section.

The breakaway section 520 is free two swing out laterally relative to the secondary section 510 in either direction without encumbrance. In this regard, the breakaway section can retain its intended function. Yet, the tension springs are used to bias the breakaway section to an orientation back in line with the secondary section (FIG. 19). In addition to the biasing force provided by the springs 530 and 540, the springs 530 and 540 provide dampening thereby turning the breakaway section into a tuned mass damper (without adding appreciable weight to the system). It is appreciated that depending upon the direction of the swing, that only one of the tension springs 530 or 540 is actively damping the system.

According to another embodiment of the current invention, one or more tuned mass dampers (TMDs) are in or on each boom semi-pan, at a position or positions calculated or measured to place them in fairly close proximity to the anti-nodal regions at the boom system Eigenfrequency and/or at anti-nodal positions of any problematical secondary or tertiary frequencies. Tuned mass dampers used for this purpose may be of the passive or active types and may be of a commercially available design, or designed specifically for the purpose. They may be attached externally to the boom's structure or mounted within it. The TMDs may be oriented to counter resonance occurring in a single plane, i.e., the horizontal plane to counter resonance in the vertical direction, or operate to counter resonance in more than one plane, i.e., to counter resonance in both the vertical and longitudinal planes.

Figure 22:
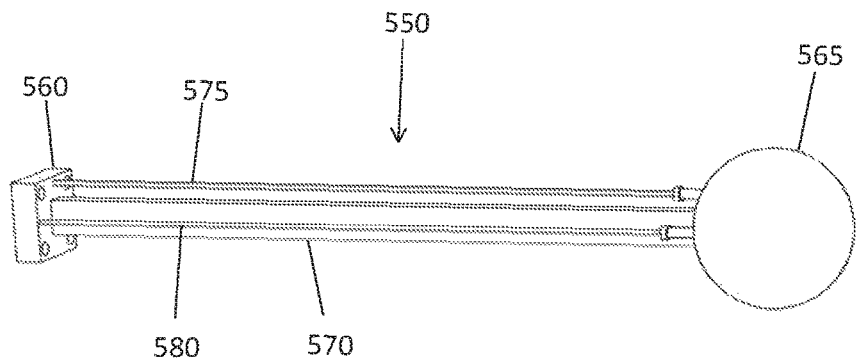
FIG. 22 is a perspective view of an embodiment of a tuned mass damper.
Figure 23:
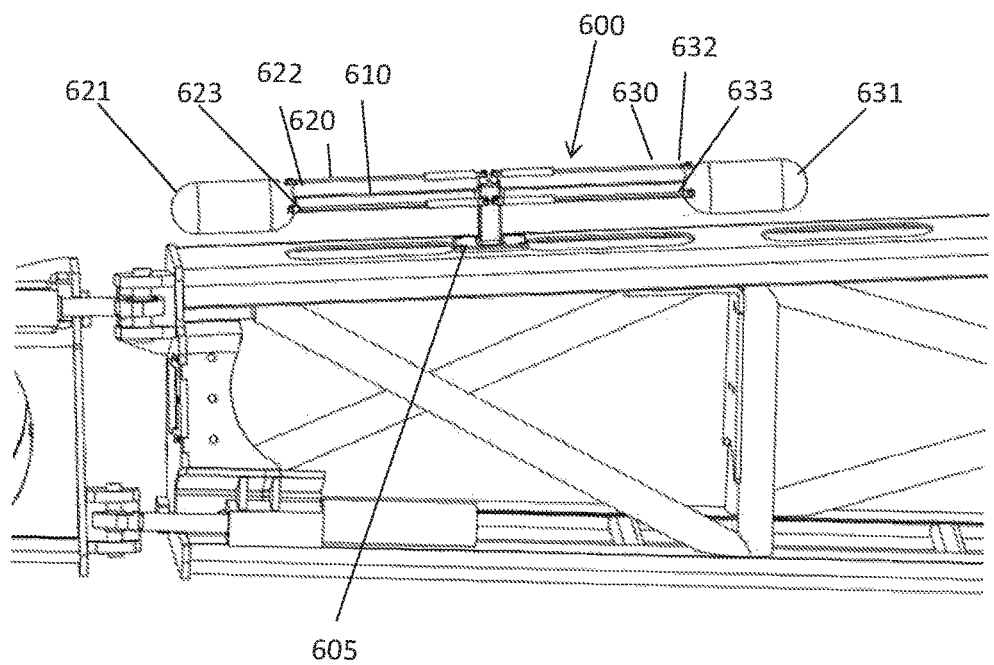
FIG. 23 is a perspective view of an alternative embodiment of a tuned mass damper.

FIG. 22 shows the principle of operation of just one of the many TMD configurations that may be used for the purpose of quelling resonant vibrations in spray booms. In this particular case the TMD is of the passive type and serves to operate to counter resonance in both the vertical and longitudinal directions, notwithstanding the Eigenfrequencies may be significantly different in these two resonant modes due to the boom's flexibility characteristics being bound by different structural and dimensional requirements in these two different orientations.

Referring again to FIG. 22, it is seen that a tuned mass damper 550 is provided having a base 560, a mass 565, a bar spring 570, a first damping rod 570 and a second damping rod 575. Component 565 is a substantial mass, supported on a rectangular cross-section beam bar spring 570, which is in turn connected at its fixed end to substantial base 560. The base 560 is bolted solidly to the boom structure though its four mounting holes at a boom span-wise location carefully calculated or empirically determined to render the TMD's function most effective. In positioning the TMD on or within the boom's structure, the elongate orientation of bar spring 570 is arranged to be essentially parallel to the elongate direction of the boom. The natural frequency of the mass 565 as it oscillates up and down, in essentially vertical displacement on bar spring 570, when excited by vertical vibratory movements in the boom fed in through base 560, is determined by the sectional characteristics of the bar spring 570, and can be tuned to a specific frequency by varying the bar spring cross section horizontal width and vertical height, effective beam length and, of course the value of mass 565. This can be similarly achieved for the natural oscillating frequency in the lateral direction. The TMD will be most effective in quelling the resonant frequency of the boom in each of the two resonant directions, vertical and longitudinal (relative to the vehicle axes) when the natural frequency closely matches the booms resonant frequencies in each of these two different directions.

In order to function as an effective TMD, the TMD mass is appropriately damped and, in the TMD depicted in FIG. 22, this is achieved by the means of two flexible damping rods, specifically rod 575 for damping in the vertical vibration direction and rod 580 for damping in the lateral vibration direction. These damping rods have their fixed ends attached at base 560, and their free ends that are slidably constrained in tubes embedded in mass 565. Accordingly, when the mass 565 oscillates in a vertical direction the free end of damping rod 575 is displaced slidably within its respective damping tube in mass 565, such that viscous shear is induced in a damping medium such as thick silicone grease present within the tube and kept in place by a seal or a flexible bellows serving the same function. A similar damping effect is realized in the lateral oscillation direction by damping rod 580 moving within its respective tube in mass 565, and again having a suitable damping medium sealed in by a seal.

It should be understood that this is a TMD concept advanced for explanatory purposes only. There are numerous ways a TMD can be configured, either as a passive device (as shown in FIG. 22, or as an active device typically using closed loop control and computer interfacing. A TMD can also be configured to impose minimal spurious reactive moments on the structure: For example, the device depicted in FIG. 22 could be mirrored about the attachment face base 560 to provide a double mass device, reminiscent of a dumbbell, which would not introduce unnecessary vibratory bending moments into the supporting structure.

An embodiment of this nature is illustrated in FIG. 23. The tuned mass damper 600 in FIG. 23 has a base 605 and a bar spring 610. A first section 620 having a mass 621 and two damping rods 622 and 623 are provided. A second section 630 is also provided and is opposite of the first section 620. The second section 630 similarly has a mass 631 and two damping rods 632 and 633.

Two masses 621 and 631 are shown mounted at either end of a flexible bar spring 610, which is itself supported at its central common nodal position by base 605 at its Eigenfrequencies in resonance in both the lateral and vertical modes, which effectively divide it into two sections, a first section 620, and a second section, 630. The supporting base 605 is, in turn, securely connected to the boom structure at, or close to, an anti-nodal position pertaining to the boom's resonant frequency that is to be damped. Damping rods 622 and 623 connect to hydraulic kinetic fluidic dampers to damp the first section, 620, and damping rods 632 and 633 act similarly for the second section 630. When the boom structure is excited towards resonance, in the horizontal or vertical modes, by imposed acceleration associated with the vehicle traversing rough terrain, or maneuvering terrain, the TMD responds by resonating at the same frequencies but out of phase with the boom structure, while the damping of the TMD acts to damp out both the TMD and boom resonance, dissipating the resonant energy as heat in the TMD's damper systems.

Similarly, damping of the oscillating mass or masses can be carried out by a variety of means other than by the viscous damping shown in FIG. 22 to the kinetic fluidic damping described in FIG. 23. For example, friction (coulomb) damping, magnetic, electromagnetic or other damping methods can readily be employed.

FIGS. 24 and 24A show a classical passive linear TMD which, in this embodiment of the invention, may be incorporated into a spray boom's structure to mitigate damaging resonance. The tuned mass damper 650 has a housing 660 with two ends 661 and 662 as well as a cover 663. The cover 663 is shown in breakaway view so that the internal components can be readily viewed. A slider rod 670, a mass 675 operable on the slider rod 670, and two springs 680 and 685 are provided. The housing 660 can be filled with an amount of fluid 690 that provides damping to the tuned mass damper 650.

Stated with more particularity, the mass 675 is freely slidably mounted on slider rod 670, and constrained by spring 680 on one side and spring 685 on the other. The mass 675, slider rod 670 and the springs 680 and 685 are themselves contained in a housing 660, which has ends 661 and 662 which directly support slider rod 670 at its outer ends, and also act as end restraints for springs 680 and 685 at their outer ends, while the same springs serve to restrain the mass 675 at their inner ends. Thus, inertial movement of the mass 675 in sliding motion on slider rod 670 against one or other of the springs, can be defined mathematically in terms of resonant frequency movement, if undamped. However, since housing cover 663 covers housing 660 and the spring-mass-slider system, to seal it hermetically, while entrapping within the enclosed volume an amount of damping fluid 690, the whole system becomes an effective TMD. The damping fluid may be a gas such as air, or a liquid. As a liquid, it may full fill or only partially fill the entrapped volume.

Figure 25:
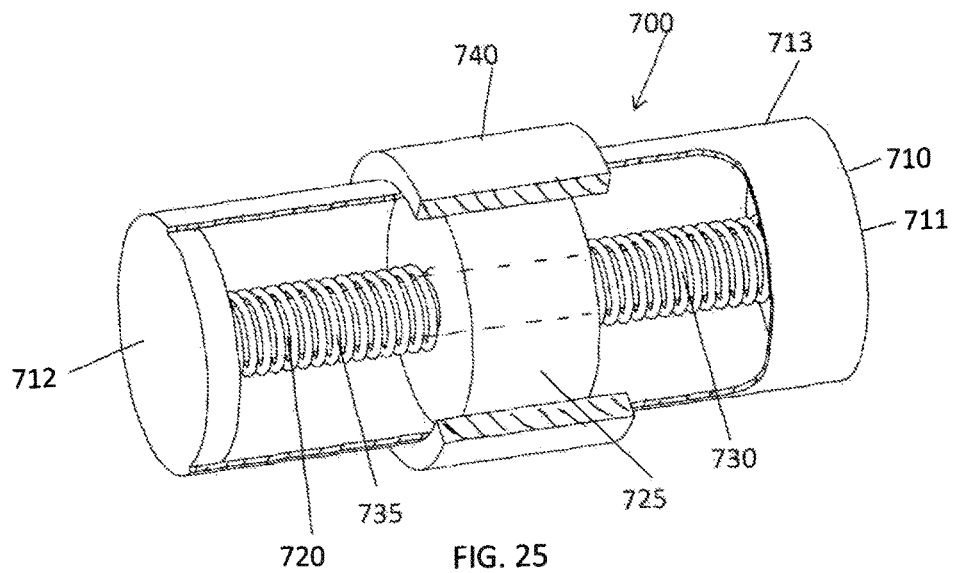
FIG. 25 is a perspective view of an alternative embodiment of a tuned mass damper.
Figure 25:
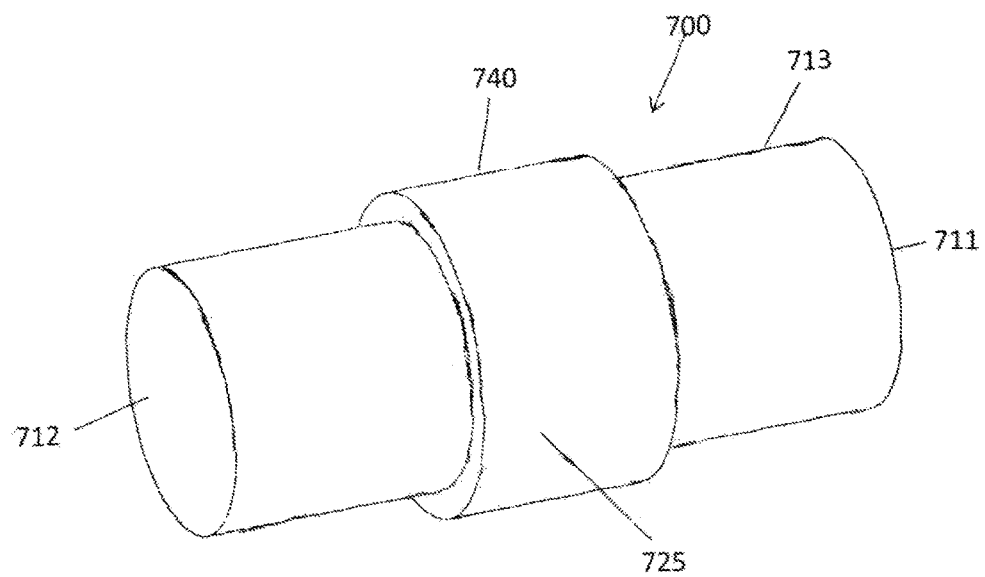

FIGS. 25 and 25A illustrate another example of an embodiment of the current invention that embraces and demonstrates two principles: That of electromagnetic damping and/or active TMD control. A tuned mass damper 700 has a housing 710 with two ends 711 and 712 and a cover 713. The cover is shown in breakaway view (with hatching) so that the interior components can be illustrated. The cover is mated with and has a diameter similar to the round ends of the housing. A slider rod 720, a mass 725 operable thereon, two springs 730 and 735 and a coil 740 are provided. The inductive coil 740 entirely encapsulates the housing around the full perimeter of the mass 725.

Figure 24:
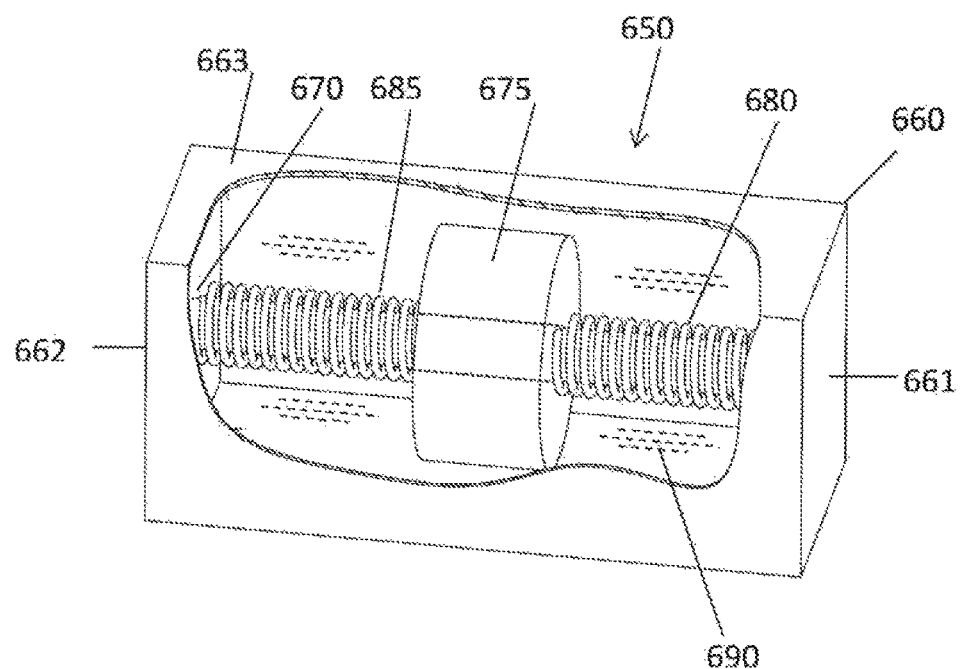
FIG. 24 is a perspective view of an alternative embodiment of a tuned mass damper.
Figure 24:
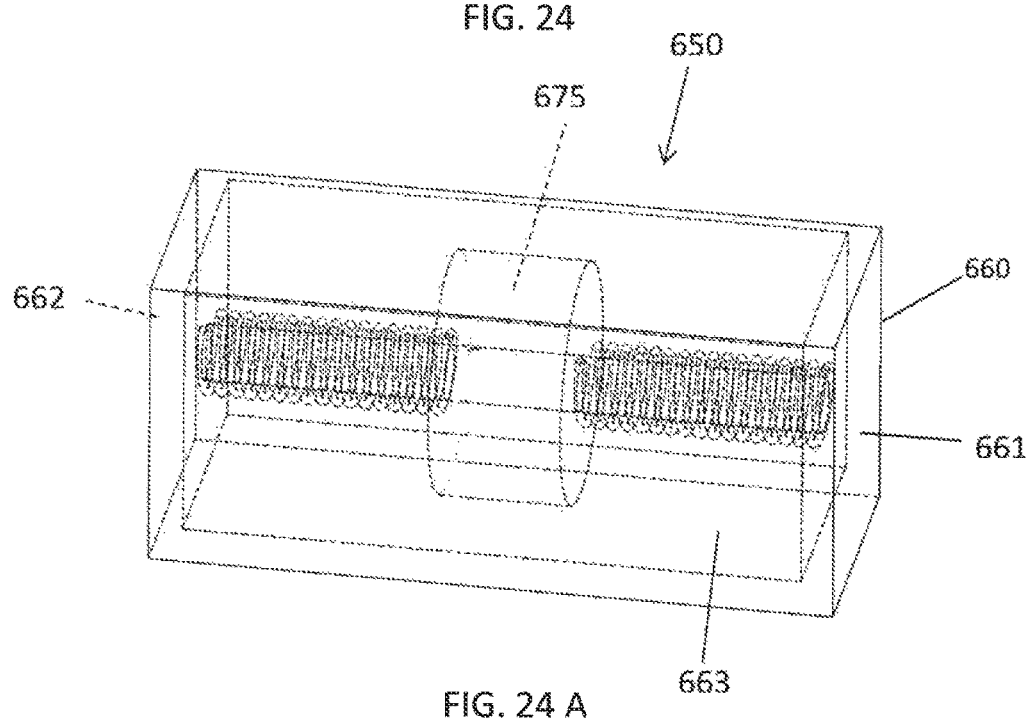

Stated more particularly, the housing 710 having ends 711 and 712, and containing slider rod 720, mass 725, and springs 730 and 735, is similar to that depicted in FIG. 24. However the housing, 710, (shown sectioned to show the internal components) supports an inductive coil 740 (also sectioned for the same reason), that serves the function of damping. This is achieved in conjunction with mass 750 being constructed of magnetic material and being magnetized, or containing within it a magnet or magnets of the permanent or electromagnetic types. The linear bearing surface between the mass 725 and the slider may be of the plain bearing type, or of the gas-bearing or recirculating rolling element types to minimize wear and/or reduce friction. The outer cover 713, may or may not be hermetically sealed, but does not contain a damping liquid. Typically the medium within the housing 710 would be ambient air, vented to minimize damping, or a sealed housing enabling the mass 725 to move freely in a vacuum for example. The primary source of damping for this form of TMD is caused by the electromagnetic inductance generated between the magnetic mass 725 and the inductive coil 740. Since this is controllable between effectively shorting-out the coil output and dissipating the resonant energy as heat within the inductive coil, or dissipating the energy elsewhere using as part of a comprehensive control strategy, this methodology is defined as an active TMD.

Figure 26:
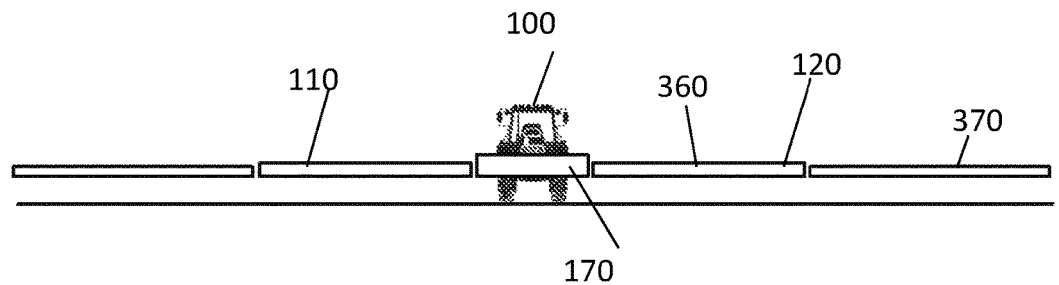
FIG. 26 is a schematic view of a boom assembly with a left and right boom in a straight position.
Figure 27:
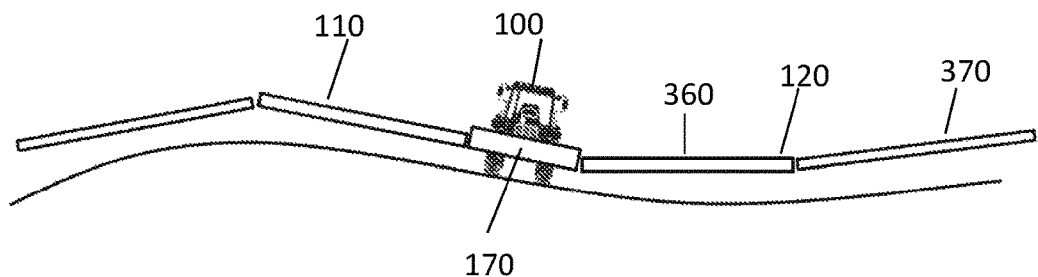
FIG. 27 is similar to FIG. 26, but shows the booms articulated to match the contour of the ground beneath.
Figure 28:
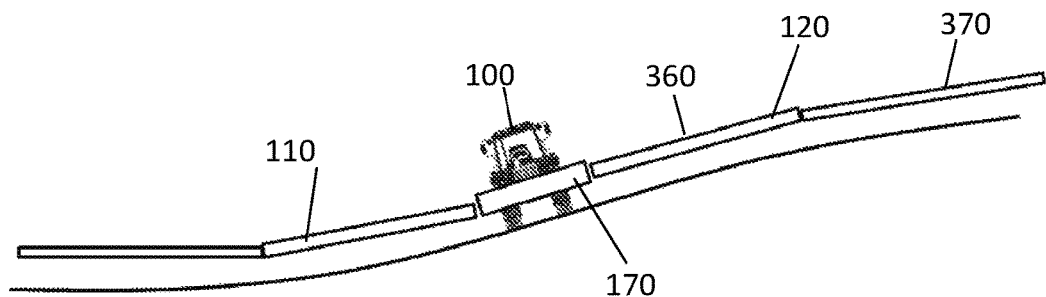
FIG. 28 is similar to FIG. 26, but shows the booms articulated to match the contour of the ground beneath.

Turning now to FIGS. 26 to 28, it is seen that the primary and secondary boom sections are readily adjustable by the structures and methods of the present invention. The left and right primary booms can conventionally be angularly adjusted relative to the center rack with hydraulic cylinders. Then, the center rack can be adjusted in a plane or near plane relative to a support assembly. By shifting air to one side of the other, the center rack can twist relative to the support frame while remaining in a same plane and generally parallel to the to support frame. Then, there is preferably a positional connector on each boom, wherein the secondary sections can be angularly adjusted relative to the primary sections. Hence, in the illustrated embodiments, it is seen the present invention can be used to create a boom pair that can maintain a desired spray height.

Thus it is apparent that there has been provided, in accordance with the invention, a planar linkage, methods of decoupling, mitigating shock and resonance, and controlling agricultural spray booms mounted on ground vehicles that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A tension gas spring for use with a spray boom having a first section and a breakaway section that can be swung relative to the first section, said tension gas spring comprising:
    a housing with a slot between a housing first end and a housing second end;
    a compressive gas strut within said housing, said compressive gas strut having a compressive gas strut first end and a compressive gas strut second end, said compressive gas strut first end being connected to said housing first end;
    a first arm pivotally connected to said compressive gas strut at said compressive gas strut second end about a pivot extending through said slot; and
    a second arm pivotally connected to said housing at said housing second end,
    wherein said compressive gas strut biases said first arm towards said second arm, said first arm being separated from said second arm when the breakaway section swings relative to the first section so that, when used with a second tension gas spring, the breakaway section is a tuned mass damper for the spray boom.

2. The tension gas spring of claim 1 wherein:
    there is an absence of damping as said first arm is forced away from said second arm; and
    said compressive gas strut provides an amount of damping as it returns said first arm towards said second arm.

3. The tension gas spring of claim 1 wherein:
    said pivot is a bolt, said first arm has a stirrup pivotally connected to the bolt at two locations.

4. The tension gas spring of claim 3 wherein:
    said slot has a slot longitudinal axis; and
    said first arm is pivotally connected to said compressive gas strut about a pivot axis that is perpendicular to said slot longitudinal axis.

* * * * *